(12) United States Patent
Shimizu

(10) Patent No.: US 11,631,002 B2
(45) Date of Patent: Apr. 18, 2023

(54) INFORMATION PROCESSING DEVICE AND INFORMATION PROCESSING METHOD

(71) Applicant: FUJITSU LIMITED, Kawasaki (JP)

(72) Inventor: Toshihiro Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 434 days.

(21) Appl. No.: 16/885,332

(22) Filed: May 28, 2020

(65) Prior Publication Data

US 2020/0410340 A1 Dec. 31, 2020

(30) Foreign Application Priority Data

Jun. 26, 2019 (JP) .............................. JP2019-119018

(51) Int. Cl.
*G06F 17/16* (2006.01)
*G06F 17/15* (2006.01)
*G06N 3/08* (2023.01)

(52) U.S. Cl.
CPC ............... *G06N 3/08* (2013.01); *G06F 17/15* (2013.01); *G06F 17/16* (2013.01)

(58) Field of Classification Search
CPC ........ G06F 17/15; G06F 17/153; G06F 17/16; G06F 17/144; G06F 17/14; G06F 17/141
(Continued)

(56) References Cited

U.S. PATENT DOCUMENTS

| 2010/0214936 | A1 | 8/2010 | Ito et al. | |
| 2017/0344876 | A1* | 11/2017 | Brothers | G06F 17/153 |
| 2018/0189237 | A1* | 7/2018 | Werner | G06F 17/153 |

FOREIGN PATENT DOCUMENTS

| JP | 2009-080693 A | 4/2009 |
| JP | 2019-008421 A | 1/2019 |

OTHER PUBLICATIONS

Zhang, Chen, et al. "Optimizing FPGA-Based Accelerator Design for Deep Convolutional Neural Networks: Proceedings of the 2015 ACM/SIGDA International Symposium on Field-Programmable Gate Arrays." ACM Conferences, Feb. 1, 2015, https://dl.acm.org/doi/abs/10.1145/2684746.2689060. (Year: 2015).*

(Continued)

*Primary Examiner* — Matthew D Sandifer
*Assistant Examiner* — Huy Duong
(74) *Attorney, Agent, or Firm* — Fujitsu Patent Center

(57) ABSTRACT

An information processing device includes: a processor configured to: calculate a combination of t and q minimizing a computation time when q computation cores compute convolution between first matrices and second matrices of t-row t-column with Winograd algorithm in parallel, where a total number of elements of the first and second matrices does not exceed a number of sets of data that can be stored in each of q storage areas of a register, and the q computation cores correspond to the q storage areas; and output a program for causing a computing machine including the q computation cores and the register to execute a process including: storing the first and second matrices in each of the q storage areas with a calculated combination of t and q, and computing convolution between the first matrix and the second matrix with the Winograd algorithm by each of the q computation cores.

8 Claims, 36 Drawing Sheets

(58) Field of Classification Search
CPC .... G06F 17/156; G06N 3/0454; G06N 3/084; G06N 3/063; G06N 3/04; G06N 3/08
See application file for complete search history.

(56) References Cited

OTHER PUBLICATIONS

Extended European Search Report dated Nov. 18, 2020 for corresponding European Patent Application No. 20174274.9, 10 pages.
Shi, Feng et al., "Sparse Winograd Convolutional neural networks on small-scale systolic arrays", arixiv. org, Cornell University Library, 201 Olin Library Cornell University Ithaca, NY 14853, Oct. 3, 2018, 7 pages.
Hong, Byungchul et al., "Multi-dimensional Parallel Training of Winograd Layer on Memory-Centric Architecture", 2018, 51st Annual IEEE/ACM International Symposium on Microarchitecture (Micro), IEEE, Oct. 20, 2018, pp. 682-695.
Kygkis, Athanasios et al., "Efficient Winograd-based Convolution Kernel Implementation on Edge Devices", 2018 55th ACM/ESDA/IEEE Design Automation Conference (DAC), IEEE, Jun. 24, 2018, pp. 1-6.
Andrew Lavin et al.,"Fast Algorithms for Convolutional Neural Networks", The IEEE Conference on Computer Vision and Pattern Recognition (CVPR), 2016, pp. 4013-4021 (Total 9 pages).
Kaiming He et al.,"Deep Residual Learning for Image Recognition", The IEEE Conference on Computer Vision and Pattern Recognition (CVPR), Dec. 10, 2015, arXiv:1512.03385v1[cs.CV], pp. 770-778 (Total 12 pages).

\* cited by examiner

FIG. 15

| | DPE0 | | | | | | | |
|---|---|---|---|---|---|---|---|---|
| | ⋮ | ⋮ | ⋮ | ⋮ | ⋮ | ⋮ | ⋮ | ⋮ |
| | 5 | 6 | 7 | 8 | | | | |
| | 6 | 7 | 8 | 0 | 1 | 2 | 3 | 4 | ─ Cin=3 |
| | 7 | 8 | 0 | 1 | 2 | 3 | 4 | 5 | ─ Cin=2 } Cout=2 |
| | 8 | 0 | 1 | 2 | 3 | 4 | 5 | 6 | ─ Cin=1 |
| | 0 | 1 | 2 | 3 | 4 | 5 | 6 | 7 | ─ Cin=0 |
| | 5 | 6 | 7 | 8 | | | | |
| | 6 | 7 | 8 | 0 | 1 | 2 | 3 | 4 | ─ Cin=3 |
| G#0 | 7 | 8 | 0 | 1 | 2 | 3 | 4 | 5 | ─ Cin=2 } Cout=1 |
| | 8 | 0 | 1 | 2 | 3 | 4 | 5 | 6 | ─ Cin=1 |
| | 0 | 1 | 2 | 3 | 4 | 5 | 6 | 7 | ─ Cin=0 |
| | 5 | 6 | 7 | 8 | | | | |
| | 6 | 7 | 8 | 0 | 1 | 2 | 3 | 4 | ─ Cin=3 |
| | 7 | 8 | 0 | 1 | 2 | 3 | 4 | 5 | ─ Cin=2 } Cout=0 |
| | 8 | 0 | 1 | 2 | 3 | 4 | 5 | 6 | ─ Cin=1 |
| | 0 | 1 | 2 | 3 | 4 | 5 | 6 | 7 | ─ Cin=0 |
| | ⋮ | ⋮ | ⋮ | ⋮ | ⋮ | ⋮ | ⋮ | ⋮ |
| | R#0 | R#1 | R#2 | R#3 | R#4 | R#5 | R#6 | R#7 |

1. b[0] = a[2];          // $g_2$
2. a[3] = a[1]*1/2;      // $\frac{1}{2}g_1$ 3. b[1] = a[0] + b[0];   // $g_0+g_2$
4. b[0] += a[0]*1/4 ;    // $\frac{1}{4}g_0+g_2$ 5. a[4] = b[0] - a[3];   // $\frac{1}{4}g_0-\frac{1}{2}g_1+g_2 = x_4$
6. a[5] = b[0] + a[3];   // $\frac{1}{4}g_0+\frac{1}{2}g_1+g_2 = x_3$ 7. a[3] = b[1] - a[1];   // $g_0 - g_1 + g_2 = x_2$
8. a[1] = b[1] + a[1];   // $g_0 + g_1 + g_2 = x_1$

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2019-119018, filed on Jun. 26, 2019, the entire contents of which are incorporated herein by reference.

FIELD

A certain aspect of embodiments described herein relates to an information processing device, a non-transitory computer-readable storage medium, and an information processing method.

BACKGROUND

Machine learning using a multi-layer neural network is called deep learning, and is applied to various fields. Various calculations are performed in each layer of the deep learning. For example, in the convolution layer, convolution between image data and a filter is performed, and the result thereof is output to a subsequent layer. Since the convolution is an operation between matrices, the calculation amount thereof is large, causing a delay in the processing speed of learning. Therefore, the Winograd algorithm has been proposed as an algorithm for reducing the calculation amount of the convolution. Note that the techniques related to the present disclosure is also disclosed in "Fast Algorithms for Convolutional Neural Networks", Andrew Lavin et al., The IEEE Conference on Computer Vision and Pattern Recognition (CVPR), 2016, pp. 4013-4021 and "Deep Residual Learning for Image Recognition", Kaiming He et al., The IEEE Conference on Computer Vision and Pattern Recognition (CVPR), 2016, pp. 770-778.

However, the Winograd algorithm has room for improvement in terms of a further increase in the processing speed of the convolution.

SUMMARY

According to an aspect of the embodiments, there is provided an information processing device including: a memory; and a processor coupled to the memory and configured to: calculate a combination of t and q that minimizes a computation time when q computation cores compute convolution between a plurality of first matrices and a plurality of second matrices of t-row t-column with Winograd algorithm in parallel, where a total number of elements of the plurality of first matrices and the plurality of second matrices does not exceed a number of sets of data that can be stored in each of q storage areas of a register, and the q computation cores respectively correspond to the q storage areas; and output a program for causing a computing machine to execute a process including: storing the plurality of first matrices and the plurality of second matrices in each of the q storage areas with use of a calculated combination of t and q, and computing convolution between the first matrix and the second matrix with use of the Winograd algorithm by each of the q computation cores, the computing machine including the q computation cores and the register.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10A to FIG. 1C are schematic views (No. 1) for describing a sequential method;

FIG. 15 illustrates the contents of the register G#0 of DPE0 immediately after the array elements are transferred by the multicast method;

FIG. 16 illustrates the contents of the register G#0 of DPE0 after sorting;

FIG. 26 is a schematic view illustrating the calculation of the equation (19) of the embodiment in the order of steps;

FIG. 27 is a schematic view illustrating the calculation of the equation (21) of the embodiment in the order of steps;

DESCRIPTION OF EMBODIMENTS

Prior to describing an embodiment, items studied by the inventor will be described.

Figure 1:
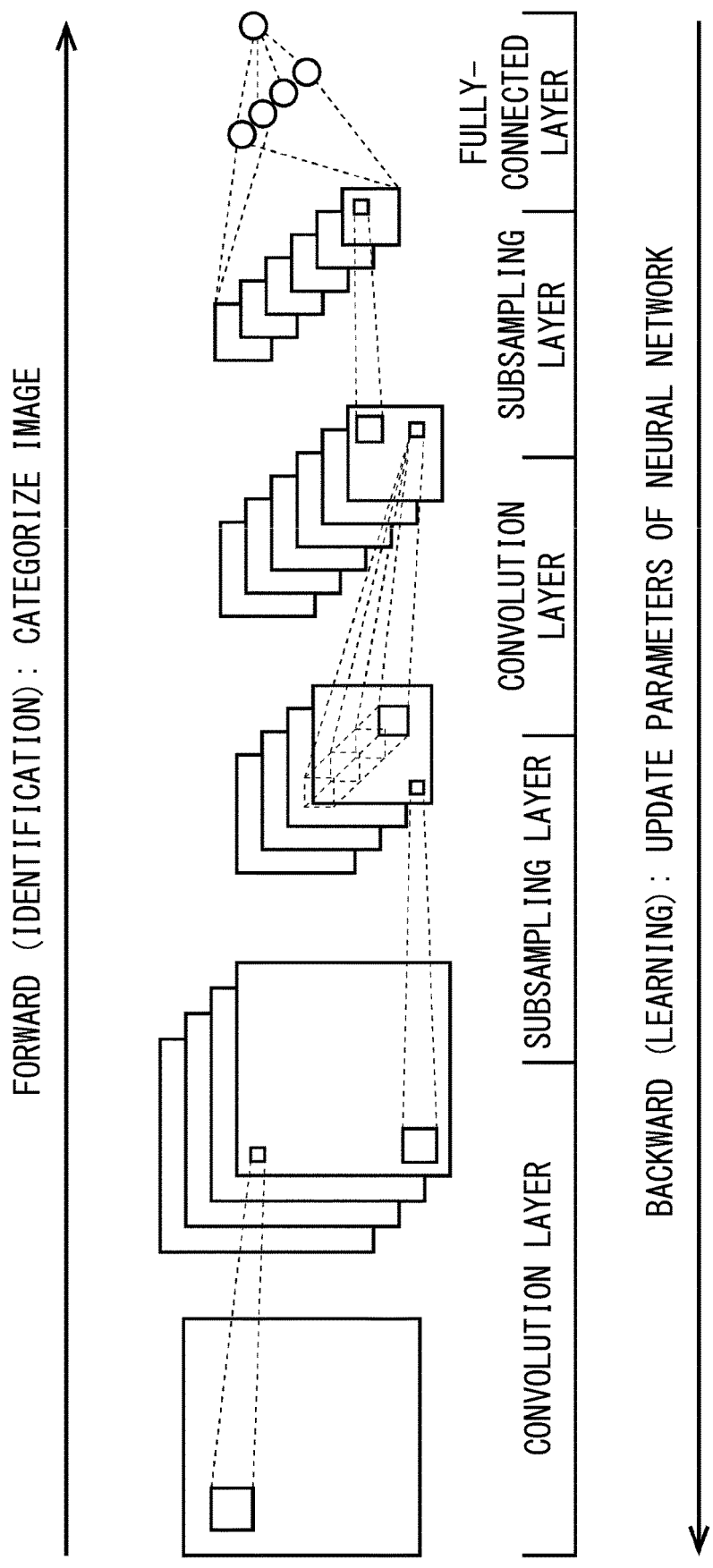
FIG. 1 schematically illustrates a processing flow of deep learning.

FIG. 1 schematically illustrates a processing flow of deep learning. In deep learning, a neural network learns the feature of the identification target, such as an image, by supervised learning of the identification target. The use of the neural network after learning allows the identification target to be identified.

The neural network is a network in which units that mimic neurons of a brain are hierarchically connected. Each unit receives data from another unit, and transfers the data to yet another unit. In the neural network, various identification targets can be identified by varying the parameters of the units by learning.

Hereinafter, with reference to FIG. 1, a convolutional neural network (CNN) used for identification of an image will be described.

This neural network has a multi-layer structure including convolution layers, subsampling layers, and a fully-connected layer. In the example of FIG. 1, two convolution layers and two subsampling layers are alternately arranged, but three or more convolution layers and three or more subsampling layers may be provided. Furthermore, a plurality of fully-connected layers may be provided. The multi-layer structure of the neural network and the configuration of each layer can be determined in advance by the designer in accordance with the target to be identified.

The process of identifying an image by the neural network is also called a forward process. In the forward process, as illustrated in FIG. 1, convolution layers and pooling layers are alternately repeated from left to right. Then, at the end, an identification target included in the image is identified in the fully-connected layer.

Moreover, the process of learning images by the neural network is also called a backward process. In the backward process, the error between the identification result and the correct answer is obtained, and the obtained error is made to backpropagate through the neural network from right to left to change the parameters of each layer of the convolution neural network.

Figure 2:
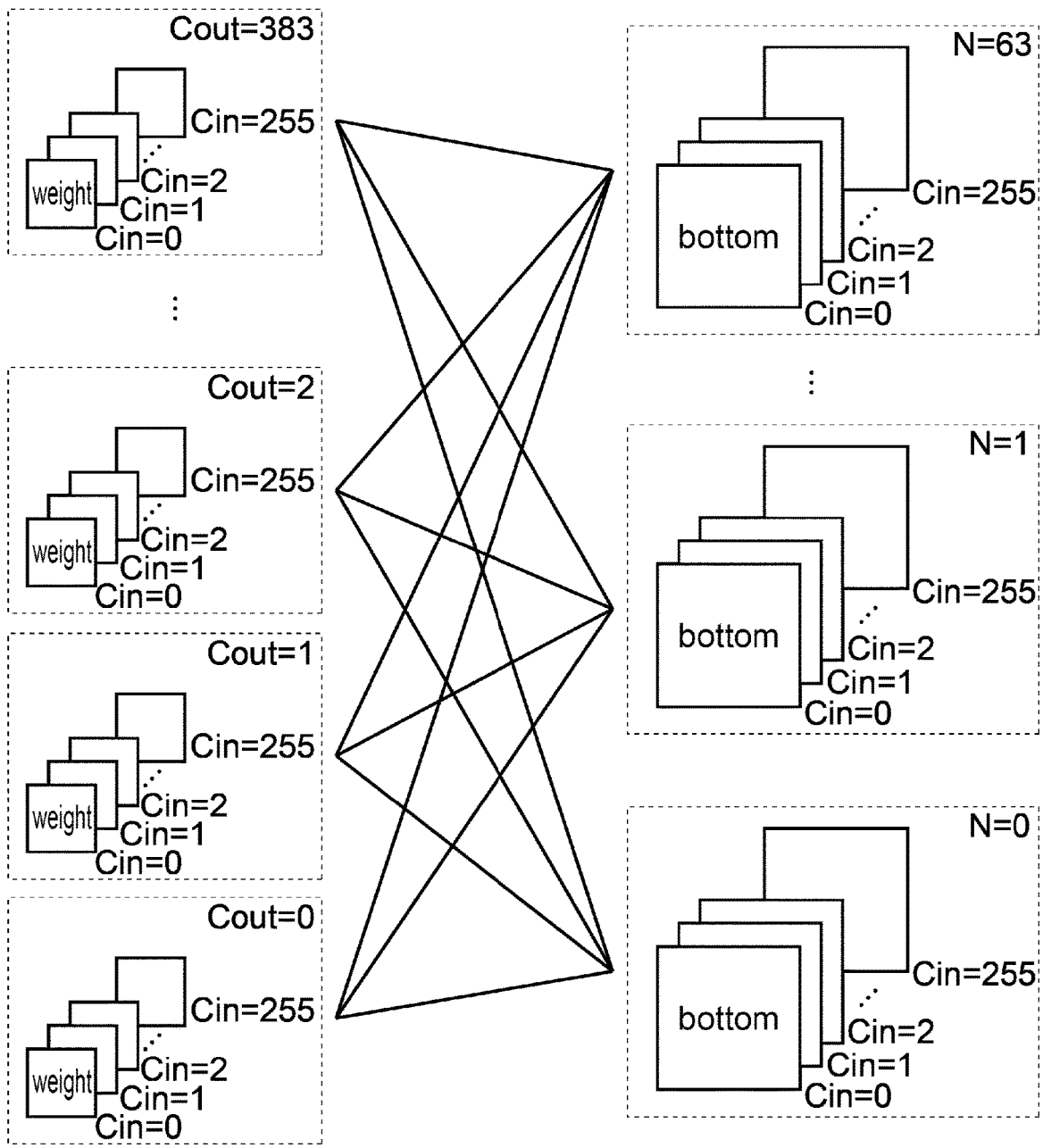
FIG. 2 schematically illustrates convolution performed in a convolution layer.

FIG. 2 schematically illustrates convolution performed in the convolution layer.

FIG. 2 illustrates convolution between a bottom matrix, in which pixel data of an input image is stored in each element, and a weight matrix, which represents a filter acting on the input image. In this example, a plurality of bottom matrices and a plurality of weight matrices are prepared, and the convolutions between them are performed.

Each of the bottom matrices is identified by a batch number N and an input channel number Cin. On the other hand, each of the weight matrices is identified by an output channel number Cout and an input channel number Cin.

In the example of FIG. 2, the convolution is performed as follows. First, one combination of the batch number N and the output channel number Cout is selected. For example, N=0 and Cout=0.

Then, from among the combinations of a plurality of bottom matrices having the selected batch number N and a plurality of weight matrices having the selected output channel number Cout, the combination of the bottom matrix and the weight matrix having the same input channel number Cn is selected. For example, when N=0 and Cout=0 as described above, the bottom matrix with N=0 and Cin=0 and the weight matrix with Cout=0 and Cin=0 are selected.

Then, the convolution between the selected bottom matrix and the selected weight matrix is performed. The matrix obtained by this convolution is called a top matrix, hereinafter.

By performing such convolution between the bottom matrices and the weight matrices with Cin=0 to 255 while the batch number N and the output channel number Cout are fixed, 256 top matrices are obtained. Thereafter, by adding up these 256 top matrices, one output matrix identified by the batch number N and the output channel number Cout is obtained.

Furthermore, by performing the above calculation while changing the batch number N and the output channel number Cout, output matrices of the total number of the batch numbers N the total number of the output channel numbers Cout are obtained. In the example of FIG. 2, 64×384 output matrices are obtained.

In the aforementioned manner, the convolution between a plurality of bottom matrices and a plurality of weight matrices are performed.

In such convolution, as described above, the convolution between the bottom matrix and the weight matrix having the same input channel number Cin is calculated. Thus, the convolution between these matrices will be described in detail.

Figure 3A:
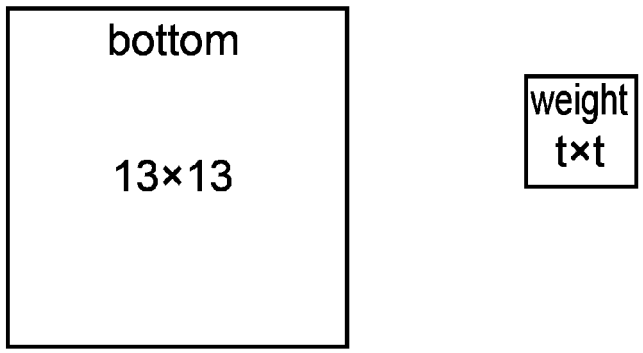
FIG. 3A to FIG. 3C schematically illustrate convolution between a bottom matrix and a weight matrix.
Figure 3B:
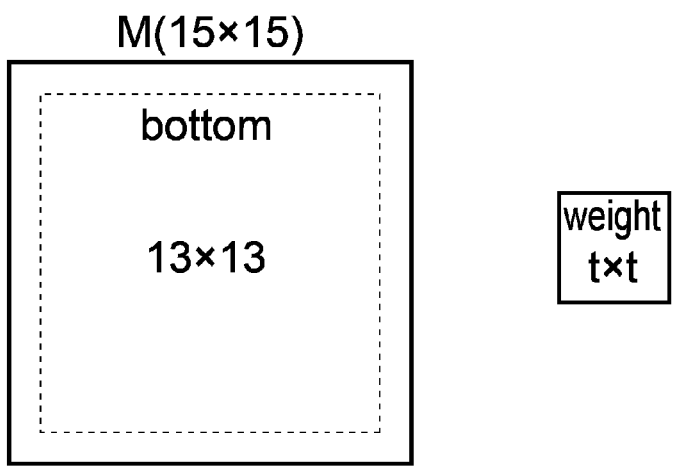
Figure 3C:
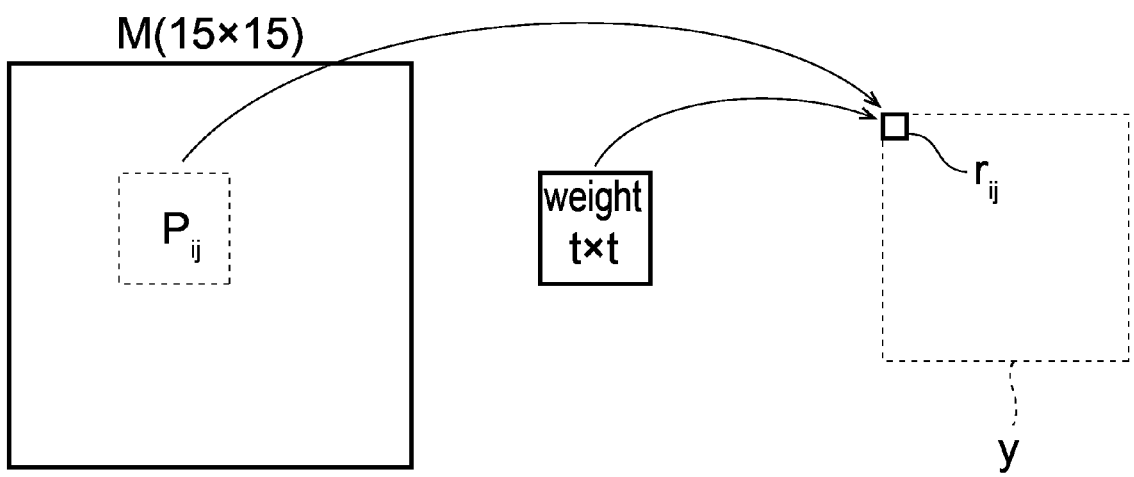

FIG. 3A to FIG. 3C schematically illustrate the convolution between the bottom matrix and the weight matrix.

First, as illustrated in FIG. 3A, the bottom matrix and the weight matrix to be subject to convolution are prepared. In this example, the bottom matrix is a 13×13 square matrix, and the weight matrix is a 3×3 square matrix.

Then, as illustrated in FIG. 3B, a 15×15 matrix M is obtained by padding zeros around the bottom matrix.

Then, as illustrated in FIG. 3C, in the matrix M, a submatrix $P_q$ having the same size as the weight matrix is extracted. Hereinafter, the element in the k-th row, l-th column of the submatrix $P_{ij}$ is represented by $(P_{ij})_{kl}$ (0≤k, l≤2), and the element in the k-th row, l-th column of the weight matrix is represented by $g_{kl}$ (0≤k, l≤2).

Moreover, the matrix obtained by convolution between the matrix M and the weight matrix is called a top matrix as described above. In this case, each element $r_{ij}$ of the top matrix can be calculated by the following equation (1).

$$r_{ij} = \sum_{k,l=0}^{2} (P_{ij})_{kl} g_{kl} \quad (1)$$

However, in this method, in order to obtain one element $r_{ij}$ of the top matrix, multiplication needs to be performed as many times as the number of elements of the weight matrix (i.e., 3×3). Therefore, it is impossible to increase the computational speed of the convolution.

The Winograd algorithm has been known as an algorithm that increases the computational speed of the convolution. Thus, the following will describe the Winograd algorithm.

As described above, there are the forward process and the backward process in deep learning. Here, the Winograd algorithm in the forward process will be described.

Figure 4A:
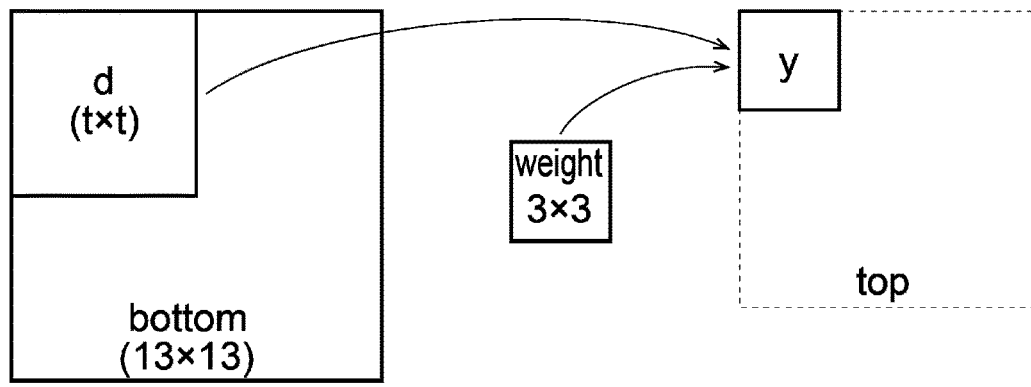
FIG. 4A to FIG. 4C schematically illustrate the Winograd algorithm in a forward process.
Figure 4B:
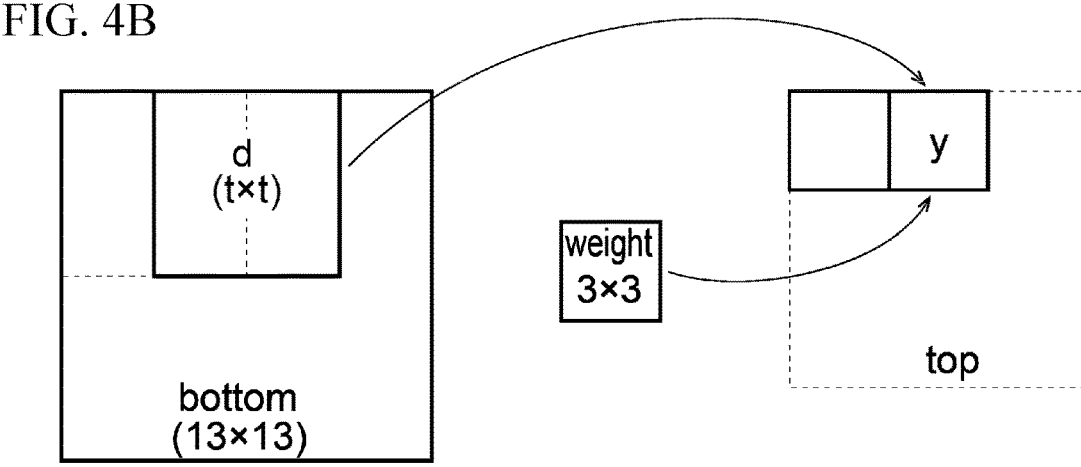
Figure 4C:
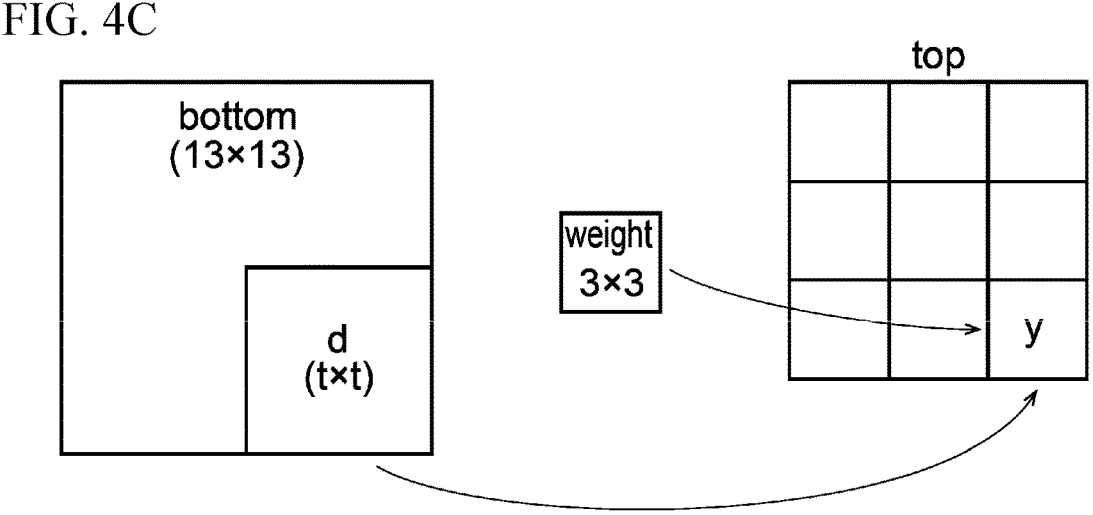

FIG. 4A to FIG. 4C schematically illustrate the Winograd algorithm in the forward process.

First, as illustrated in FIG. 4A, a t×t sub-bottom matrix d is segmented from the bottom matrix. Here, t is a natural number. Then, a sub-top matrix y is obtained in accordance with the following equation (2).

$$y = A^T \{(GgG^T) \odot (B^T dB)\} A \quad (2)$$

The sub-top matrix y is a matrix that forms a part of the top matrix.

B, G, and A in the equation (2) are constant matrices. The elements and the sizes of these constant matrices B, G, and A vary in accordance with the size of each matrix g, d. For example, when the size of the weight matrix g is 3×3 and the size of the sub-bottom matrix d is 4×4, the elements and the size of each constant matrix B, G, A are expressed by the following equation (3).

$$B^T = \begin{pmatrix} 1 & 0 & -1 & 0 \\ 0 & 1 & 1 & 0 \\ 0 & -1 & 1 & 0 \\ 0 & 1 & 0 & -1 \end{pmatrix} \quad (3)$$

$$G = \begin{pmatrix} 1 & 0 & 0 \\ \frac{1}{2} & \frac{1}{2} & \frac{1}{2} \\ \frac{1}{2} & -\frac{1}{2} & \frac{1}{2} \\ 0 & 0 & 1 \end{pmatrix}$$

$$A^T = \begin{pmatrix} 1 & 1 & 1 & 0 \\ 0 & 1 & -1 & -1 \end{pmatrix}$$

The operator "$\odot$" in the equation (2) denotes element-wise multiplication of matrices. For example, when elements of each of arbitrary matrices U and V having the same dimensions are represented by $u_{ij}$ and $v_{ij}$, respectively, and the ij element of $U \odot V$ is represented by $(U \odot V)_{ij}$, $(U \odot V)_{ij} = u_{ij} v_{ij}$.

Then, as illustrated in FIG. 4B, the position in which the sub-bottom matrix d is segmented from the bottom matrix is shifted by two columns from the position in the case of FIG. 4A, and the segmented sub-bottom matrix d undergoes the same calculation as above. The obtained sub-top matrix y forms the block next to the sub-top matrix y obtained in FIG. 4A in the top matrix.

As described above, by repeatedly shifting, by two in columns and rows, the position in which the sub-bottom matrix d is segmented from the bottom matrix, the top matrix formed from the sub-top matrices y is obtained as illustrated in FIG. 4C.

Through the above process, the convolution between the bottom matrix and the top matrix with use of the Winograd algorithm is completed.

In the Winograd algorithm of the equation (2), once the matrix $GgG^T$ and the matrix $B^T dB$ are made, the convolution can be computed at high-speed because the convolution can be performed only by calculating element-wise products of the matrix $GgG^T$ and the matrix $B^T dB$.

The inventor calculated the computation time for the case where the size of the weight matrix g was 3×3 and the size of the sub-bottom matrix d was 4×4 as in the above example. The calculated computation time was 1152 cycles in the examples of FIG. 3A to FIG. 3C that do not use the Winograd algorithm. Note that the number of "cycles" is equivalent to the number of times of writing data into a register.

On the other hand, when the Winograd algorithm was used, the computation time was 940 cycles, and the result reveals that the computation speed is increased by 1.23 (=1152/940) times from those in the examples of FIG. 3A to FIG. 3C.

Next, a computing machine that performs the convolution with use of the Winograd algorithm will be described.

Figure 5:
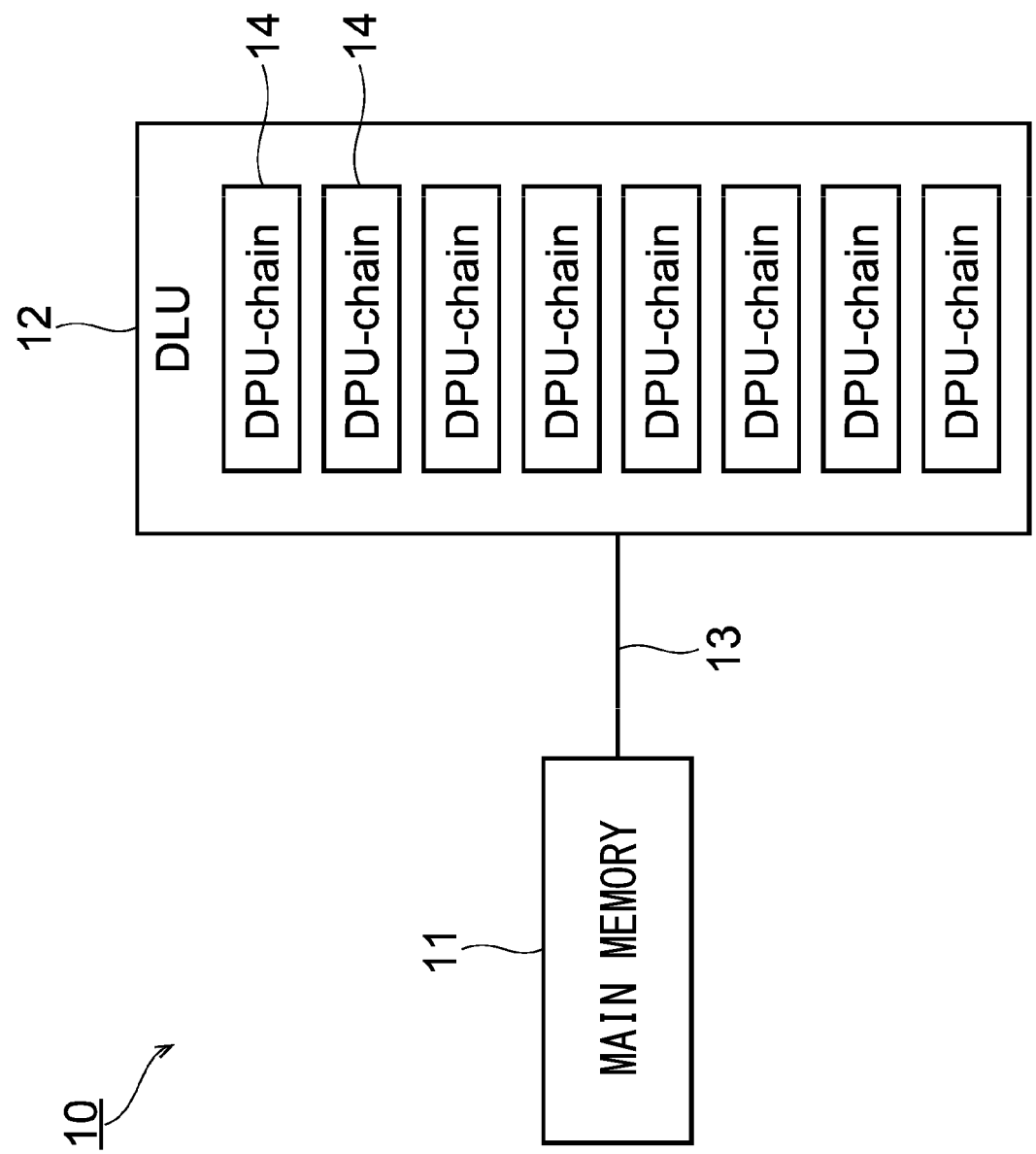
FIG. 5 is a hardware configuration diagram of a computing machine for performing the convolution in deep learning.

FIG. 5 is a hardware configuration diagram of a computing machine for performing convolution in deep learning or the like.

As illustrated in FIG. 5, a computing machine 10 includes a main memory 11 and a processor 12 that are interconnected through a bus 13.

The main memory 11 is a device, such as a dynamic random access memory (DRAM), that temporarily stores data, and executes various programs in cooperation with the processor 12.

On the other hand, the processor 12 is a hardware device including a computing unit such as an arithmetic and logic unit (ALU). In this example, a Deep Learning Unit (DLU: registered trade mark) is used as the processor 12. The DLU is a processor having an architecture suitable for deep learning, and includes eight deep learning processing unit (DPU)-chains 14.

Figure 6B:
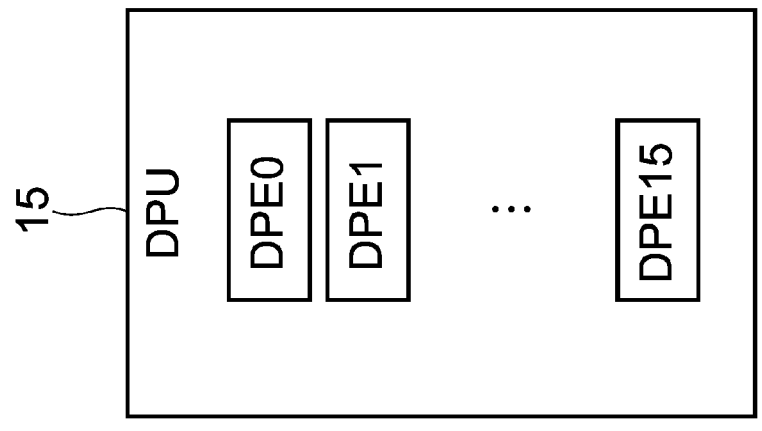
FIG. 6B is a hardware configuration diagram of one DPU.
Figure 6A:
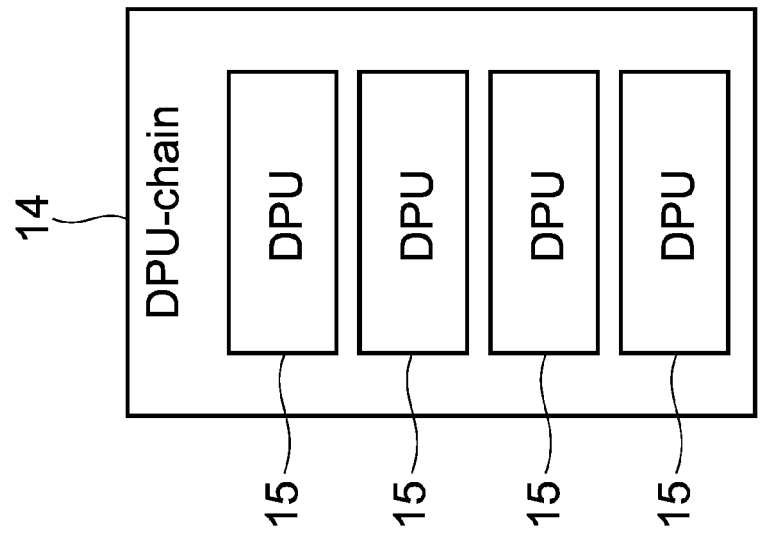
FIG. 6A is a hardware configuration diagram of one DPU-chain.

FIG. 6A is a hardware configuration diagram of one DPU-chain 14.

As illustrated in FIG. 6A, the DPU-chain 14 includes four DPUs 15. The parallel computation is performed in each of these DPUs 15, as described later.

FIG. 6B is a hardware configuration diagram of one DPU 15.

Figure 7:
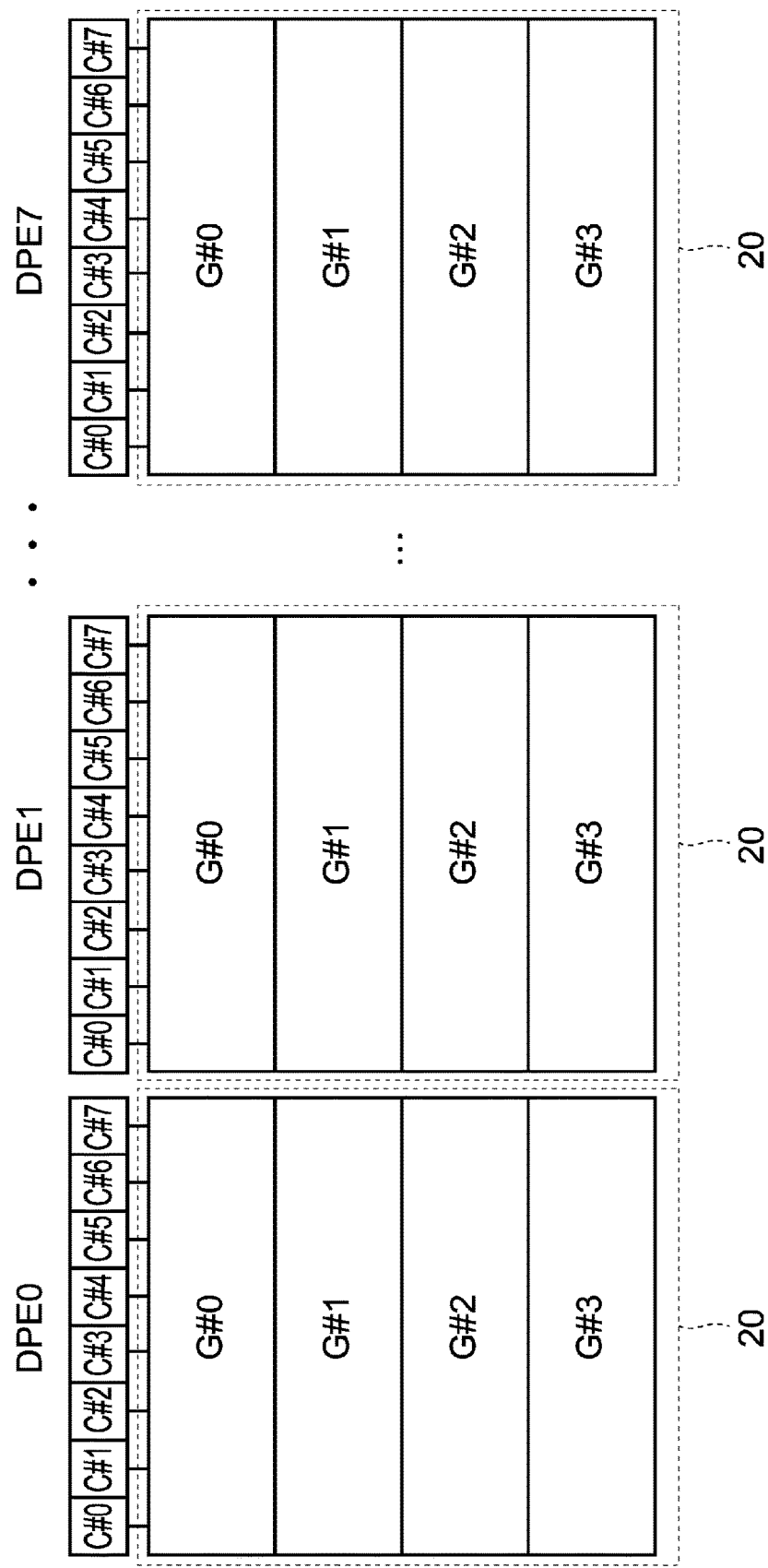
FIG. 7 is a hardware configuration diagram of each DPE.

As illustrated in FIG. 6B, the DPU 15 includes 16 deep learning processing elements (DPEs) 0 to 15. FIG. 7 is a hardware configuration diagram of each DPE.

Although the total number of DPEs is 16 as illustrated in FIG. 6B, hereinafter, only DPE0 to DPE7 will be described.

As illustrated in FIG. 7, each of DPE0 to DPE7 includes eight computation cores C#0 to C#7, and a register file 20 that is readable/writable by the computation cores C#0 to C#7.

The computation cores C#0 to C#7 are individual single instruction multiple data (SIMD) computation units, and the parallel computation can be performed in the computation cores C#0 to C#7.

On the other hand, the register file 20 is coupled to the main memory 11 via the bus 13 (see FIG. 5), stores data read from the main memory 1 therein, and stores results of computation by the computation cores C#0 to C#7 therein.

In this example, the register file 20 is divided into four registers G#0 to G#3 configured to be readable/writable in parallel. For example, when the register G#0 reads data from the main memory 11, the results of computation by the computation cores C#0 to C#7 can be stored in the register G#1 in parallel to the reading of data by the register G#0.

Figure 8:
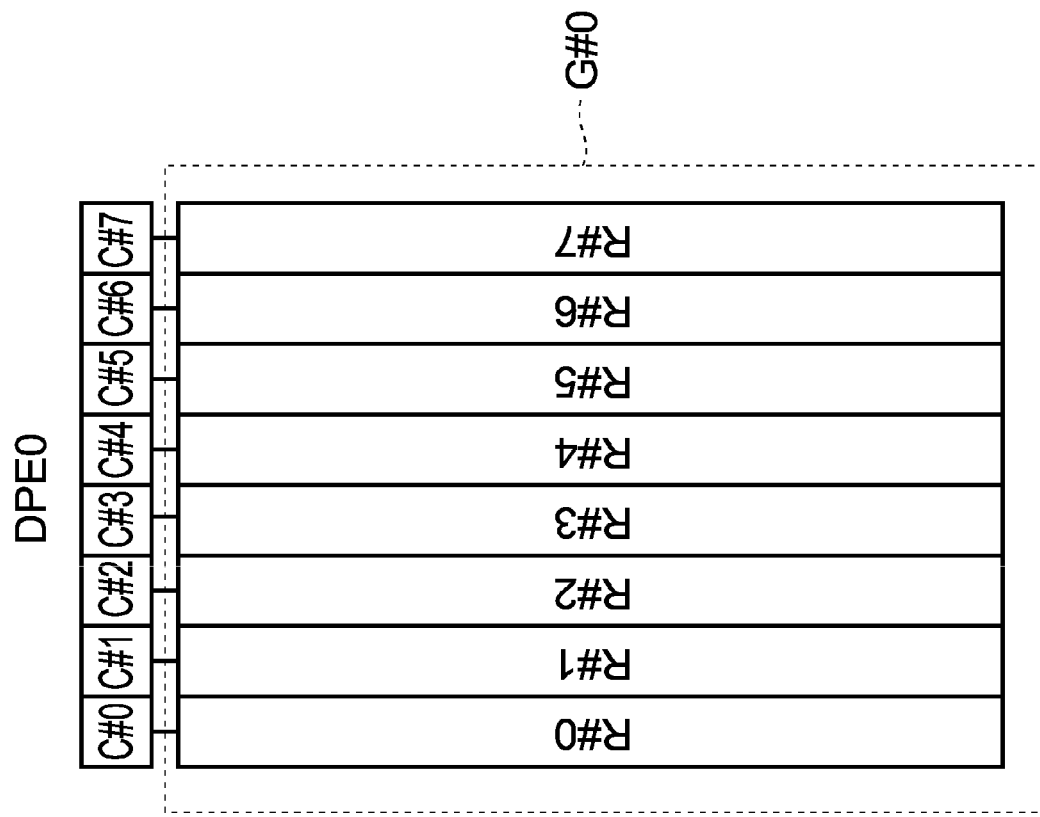
FIG. 8 is a hardware configuration diagram of DPE0.

FIG. 8 is a hardware configuration diagram of DPE0. Since DPE1 to DPE15 have the same hardware configuration as DPE0, the description thereof is omitted. FIG. 8 illustrates only the hardware configuration of the register G#0 among the registers G#0 to G#3 of the register file 20. Other registers G#1 to G#3 have the same hardware configuration as the register G#0.

As illustrated in FIG. 8, the register G#0 includes eight banks R#0 to R#7. Each of the banks R#0 to R#7 is an example of a storage area, and is provided so as to correspond to each of the computation cores C#0 to C#7. For example, the bank R#0 is a storage area corresponding to the computation core C#0. When the computation core C#0 performs computation, the computation core C#0 reads data in the bank R#0, or the computation core C#0 writes the computational result in the bank R#0.

Figure 9:
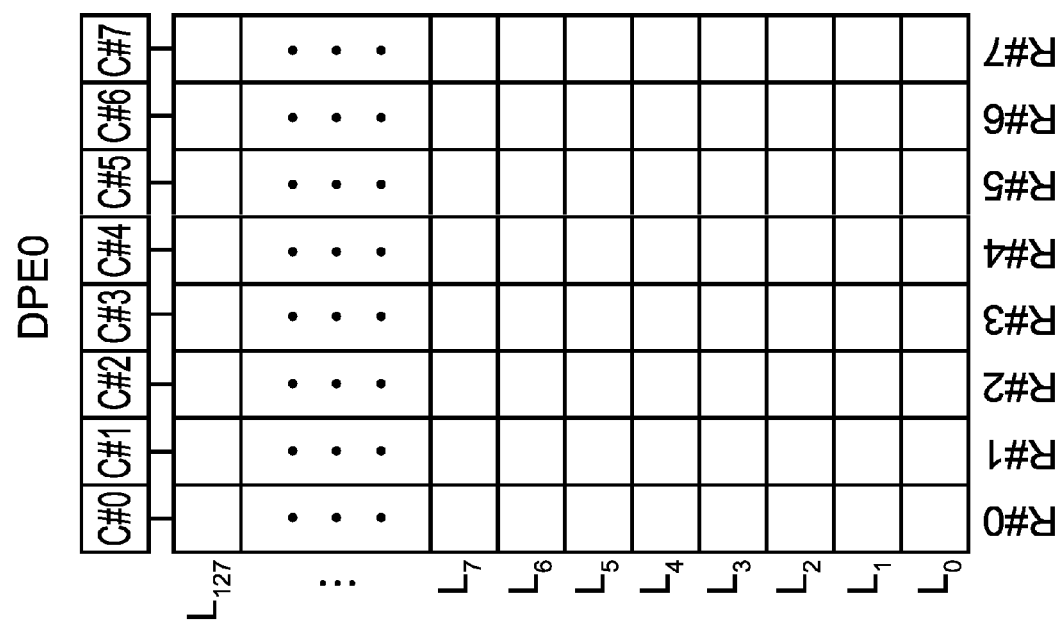
FIG. 9 is a diagram for describing line numbers assigned to banks R#0 to R#7.

FIG. 9 is a diagram for describing line numbers assigned to the banks R#0 to R#7.

The line number is an identifier for identifying each entry of the banks R#0 to R#7. In this example, 128 line numbers: $L_0$ to $L_{127}$ are used. Data stored in each entry is not particularly limited. In this example, floating-point data is stored in one entry. Thus, 127 sets of floating-point data can be stored in the bank R#0. The same applies to the banks R#1 to R#7.

When convolution of deep learning is performed, the elements of the matrix to be subject to the convolution are stored in each entry. In this case, the elements of the matrix is stored in the main memory 11 as array elements.

Here, a description will be given of an expansion method for expanding array elements stored in the main memory 11 to DPE0 to DPE7.

There are a sequential method and a multicast method as the expansion method. First, the sequential method will be described.

FIG. 10A to FIG. 11C are schematic views for describing the sequential method.

In this example, array elements a[0], a[1], a[2], . . . , a[127] stored in the main memory 11 are expanded to DPE0 to DPE7.

Figure 10A:
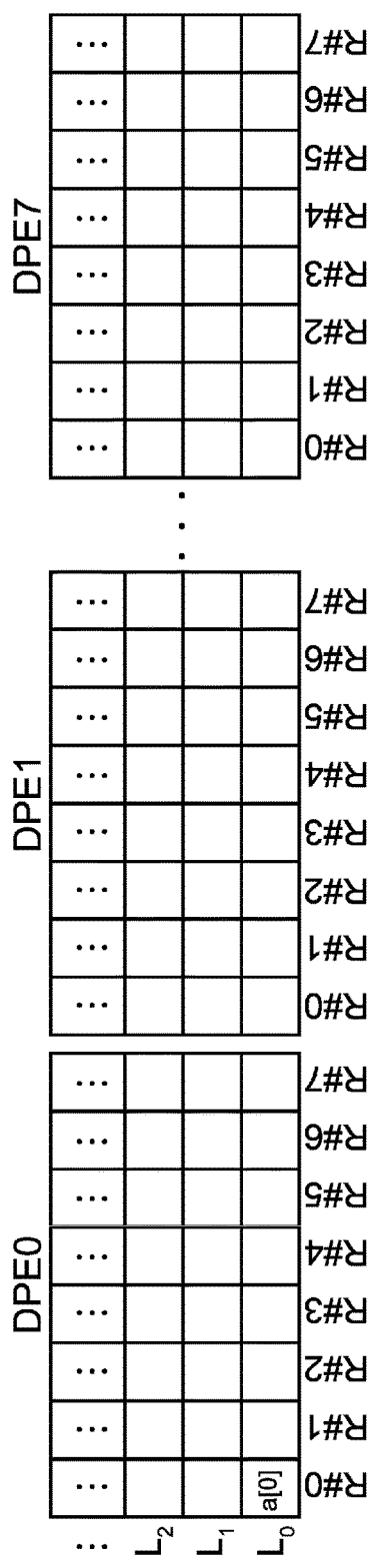

In this case, as illustrated in FIG. 10A, the first array element a[0] is stored in the entry identified by the line number to in the bank R#0 of DPE0.

Figure 10B:
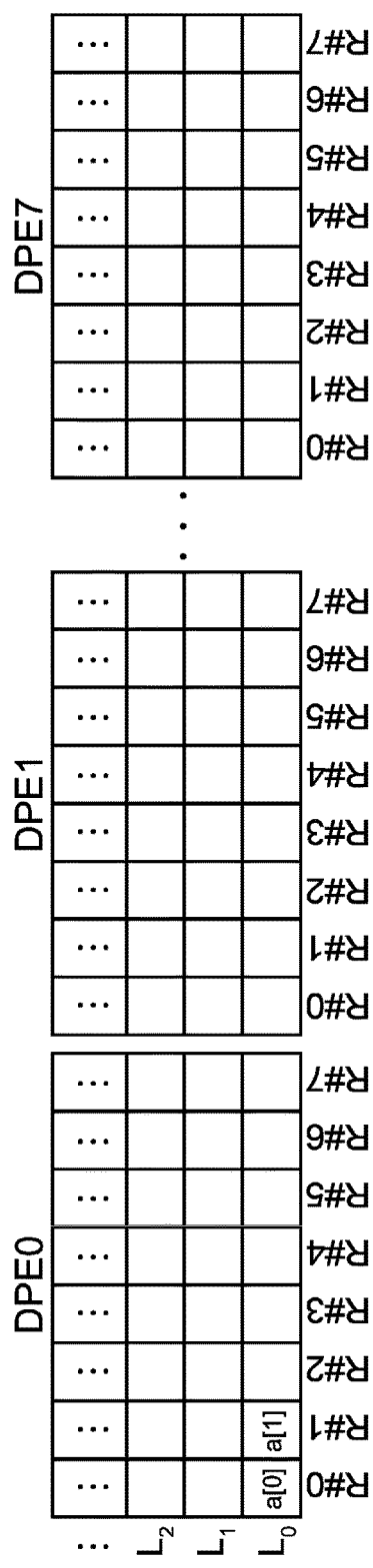

Then, as illustrated in FIG. 10B, the next array element a[1] is stored in the bank R#1, which is next to the bank R#0, without changing the line number $L_0$.

Figure 10C:
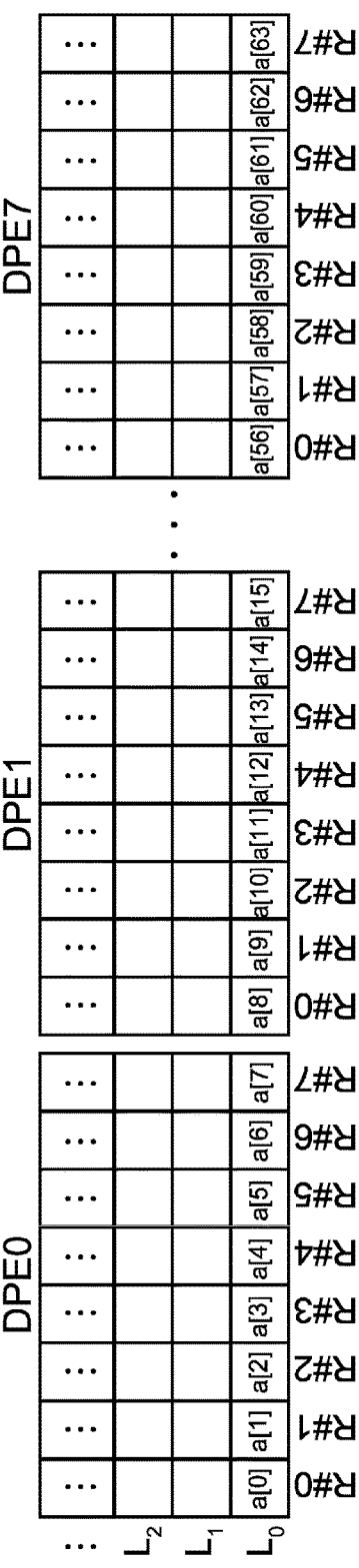

In the same manner, as illustrated in FIG. 10C, the array elements are successively stored in the banks next to one another without changing the line number $L_0$. Accordingly, the entries identified by the line number $L_0$ in the banks R#0 to R#7 of DPE0 to DPE7 are filled with the array elements a[0], a[11], a[2], . . . a[63].

Figure 11A:
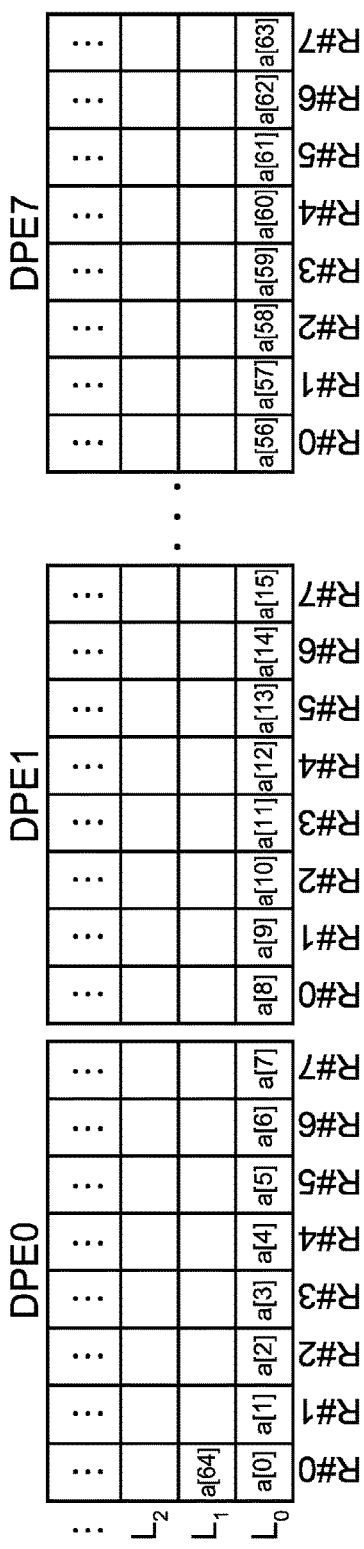
FIG. 11A to FIG. 11C are schematic views (No. 2) for describing the sequential method.

Thereafter, as illustrated in FIG. 11A, the next array element a[64] is stored in the entry identified by the line number $L_1$ in the bank R#0 of DPE0.

Figure 11B:
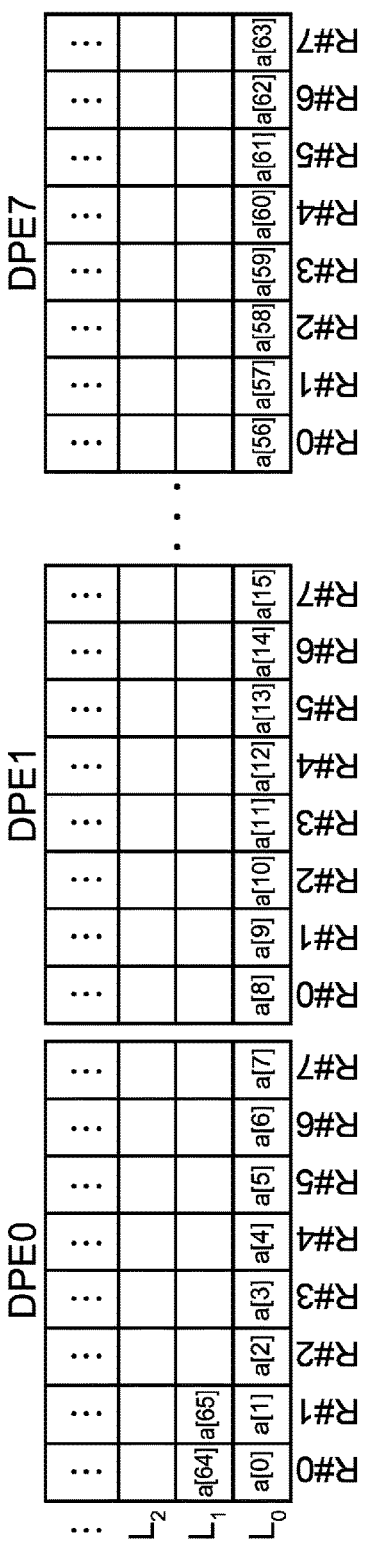

Then, as illustrated in FIG. 11B, the next array element a[65] is stored in the next bank R#1 without changing the line number $L_1$.

Figure 11C:
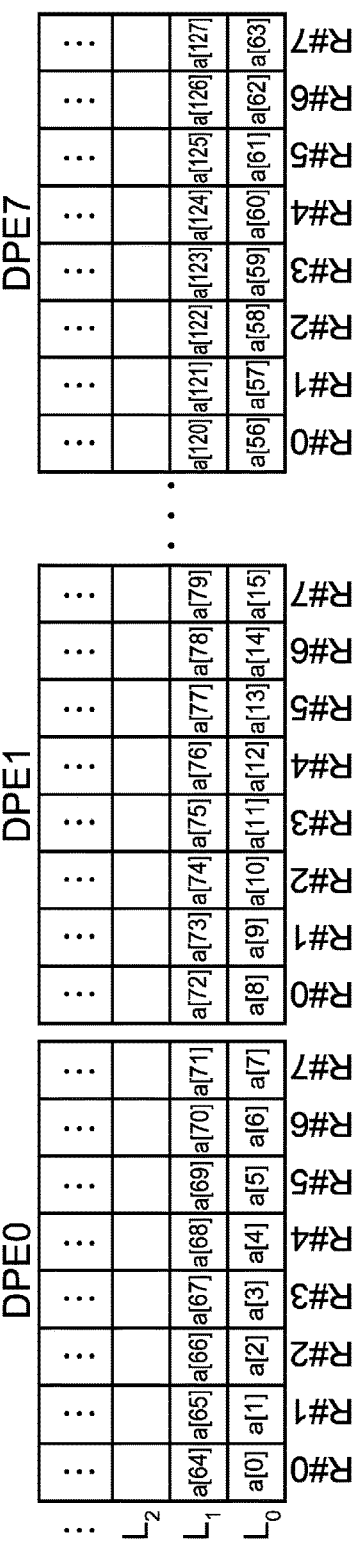

Furthermore, the array elements are successively stored in the banks next to one another without changing the line number $L_1$. Accordingly, as illustrated in FIG. 11C, the entries identified by the line number $L_1$ in the banks R#0 to R#7 of DPE0 to DPE7 are filled with the array elements a[64], a[65], a[66], . . . , a[127].

Through the above processes, the array elements a[ ], a[1], a[2], . . . , a[127] are expanded to DPE0 to DPE7 by the sequential method. According to the sequential method described above, the entries having the same line number $L_i$ of DPE0 to DPE7 are sequentially filled, and when the last entry of the line number L is filled, the array elements are stored in the entries with the next line number $L_{i+1}$.

Figure 12:
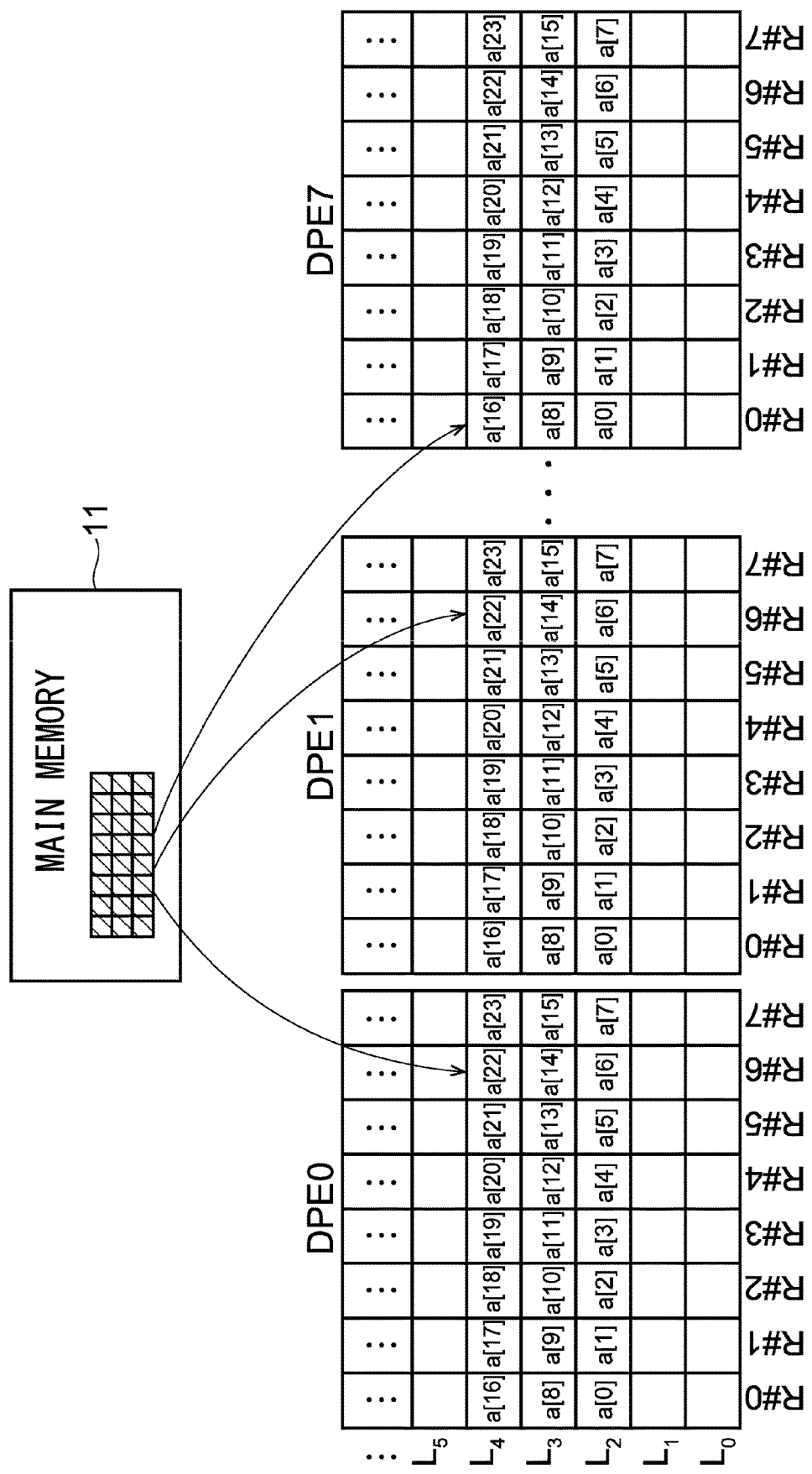
FIG. 12 is a schematic view for describing a multicast method.

Next, the multicast method will be described. FIG. 12 is a schematic view for describing the multicast method.

In this example, the array elements a[0], a[1], a[2], . . . , a[23] stored in the main memory 11 are expanded to DPE0 to DPE7.

in the multicast method, the array elements a[0], a[1], a[2], . . . , a[23] are sequentially stored in the DPE0. In the same manner, the array elements a[0], a[1], a[2], . . . , a[23] are stored in each of DPE1 to DPE7. In this method, the same array elements are stored in each of DPE0 to DPE7.

Then, the contents of the register when the computing machine 10 performs the convolution with the Winograd algorithm will be described.

Figure 13:
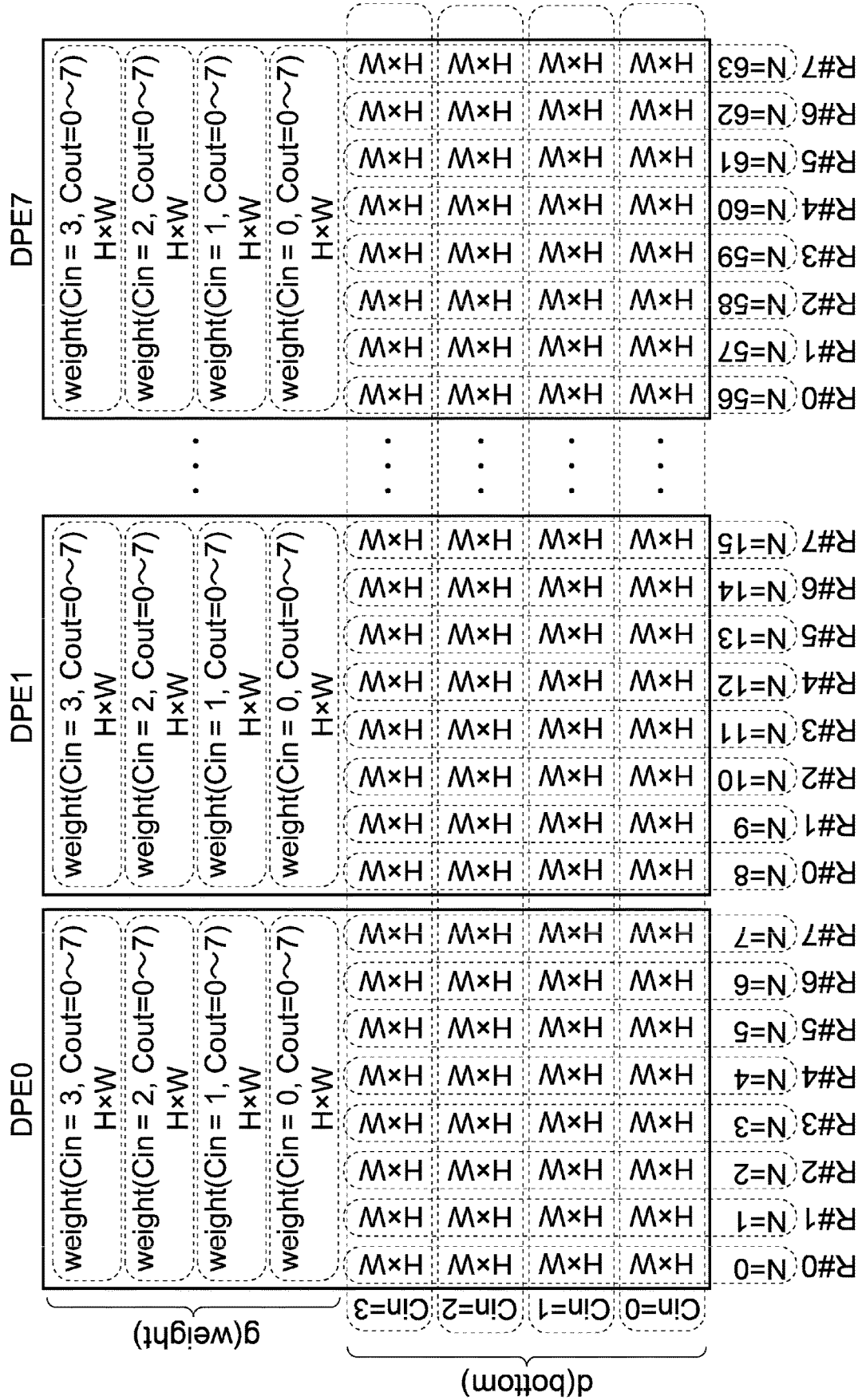
FIG. 13 schematically illustrates the contents of a register G#0 of each DPE.

FIG. 13 schematically illustrates the contents of the register G#0 of each DPE.

Hereinafter, the symbol identical to the symbol representing a matrix will be used to represent the array in which the elements of the matrix are stored. For example, the array in which the elements of a t×t bottom matrix d are stored is represented by d, and the array in which the elements of a 3×3 weight matrix g are stored is represented by g.

Moreover, these arrays d and g are expressed by the following expression (4).

$$d[Cin][H][W][N]$$

$$g[Cout][Cin][H][W] \qquad (4)$$

In the expression (4). N is a batch number having a value of 0 to 63. Cin is an input channel number having a value of 0 to 255, and Cout is an output channel number having a value of 0 to 383.

Each of H and W is a variable identifying an element in one bottom matrix. Similarly, each of H' and W' is a variable identifying an element in one weight matrix.

In this case, the array d is expanded to the registers G#0 of DPE0 to DPE7 by the sequential method.

In the case of a multi-dimensional array such as the array d, the array elements are stored in the register G#0 in sequence from the array element in the lowest level. The element in the lowest level of the array d is identified by the batch number N. Thus, the array elements of which the batch numbers N are 0, 1, . . . , 7 are sequentially stored in the banks R#0, R#1, . . . , R#7 of DPE0, respectively. Then, the array elements of which the batch numbers N are 8, 9, . . . , 15 are sequentially stored in the banks R#0, R#1, . . . , R#7 of DPE1, respectively. In this manner, the elements of which the batch numbers N are 0 to 63 are expanded to DPE0 to DPE7.

Moreover, in the array d[Cin][H][W][N], the elements in the higher-levels identified by Cin, H, and W are treated as follows.

First, as illustrated in FIG. 4A, the position in which the t×t sub-bottom matrix d is segmented from the bottom matrix is fixed, and then, t×t elements of the segmented sub-bottom matrix dare stored in [H][W]. In addition, for Cin, 0 to 4 of the values of 0 to 255 are selected.

Accordingly, t×t matrix elements corresponding to Cin=0 are expanded to DPE0 to DPE7. Similarly, t×t matrix elements corresponding to each of Cin=1, Cin=2, and Cin=3 are also expanded to DPE0 to DPE7.

On the other hand, the array g is expanded to the register G#0 of each of DPE0 to DPE7 by the multicast method.

In this example, the array elements of which the value of Cout is 0 to 7 are multicasted in the unit of the input channel number Cin. For example, the elements with Cin=0 among the array elements of which the value of Cout is 0 to 7 are multicasted to each of DPE0 to DPE7. Similarly, the array elements with Cin=0, Cin=1, Cin=2 are transferred to DPE0 to DPE7 by multicasting.

However, when the array g is transferred by the multicast method as described above, the regularity between the values of the input channel number Cin and the output channel number Cout in the bank R#0 of DPE0 is lost. This makes it inconvenient for the computation core C#0 corresponding to the bank R#0 to convolute the arrays g and d with the Winograd algorithm. The same applies to the computation cores C#1 to C#7 and DPE1 to DPE7. Thus, the elements of the array g are sorted as follows.

Figure 14:
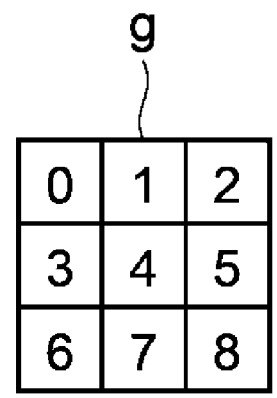
FIG. 14 schematically illustrates array elements of an array g in a main memory.

FIG. 14 schematically illustrates the array elements of the array g in the main memory 11.

As described above, the array g is an array representing the weight matrix, and corresponds to a 3×3 square matrix. Thus, hereinafter, numbers 0, 1, . . . , 8 are assigned to respective elements of the 3-3 square matrix to identify each element by the assigned number.

Accordingly, when the array g is described as g[Cout][Cin][H'][W'] as with the expression (4), the numbers 0, 1, . . . , 8 are assigned to each of [H'] and [W'].

FIG. 15 illustrates the contents of the register G#0 of DPE0 immediately after the array elements are transferred by the multicast method described above.

As illustrated in FIG. 15, when the array elements are transferred by the multicast method, the first lines of the banks R#0 to R#7 are filled with the elements of g[Cout][Cin][H'][W'] in sequence from the element in the lower level of g[Cout][Cin][H'][W']. Then, the last bank R#7 of the first line is filled, the second lines are filled in sequence.

The number of elements of the weight matrix g is nine, whereas the number of the banks R#0 to R#7 is eight. Thus, the numbers of both do not match Therefore, when the matrix elements are transferred to the register by the multicast method as described above, nine elements with Cin=0 and Cout=0 are stored in the register across two lines. The same applies to other combinations of Cin and Cout.

Therefore, various array elements with different values of Cin and Cout are stored in the bank R#0, resulting in decrease in regularity between Cin and Cout in the bank R#0.

Thus, in this example, each of the computation cores C#0 to C#7 of DPE0 uses one of the remaining registers G#1 to G#3 of DPE0 as a buffer to sort the elements of the array g in the register G#0.

Figure 16:
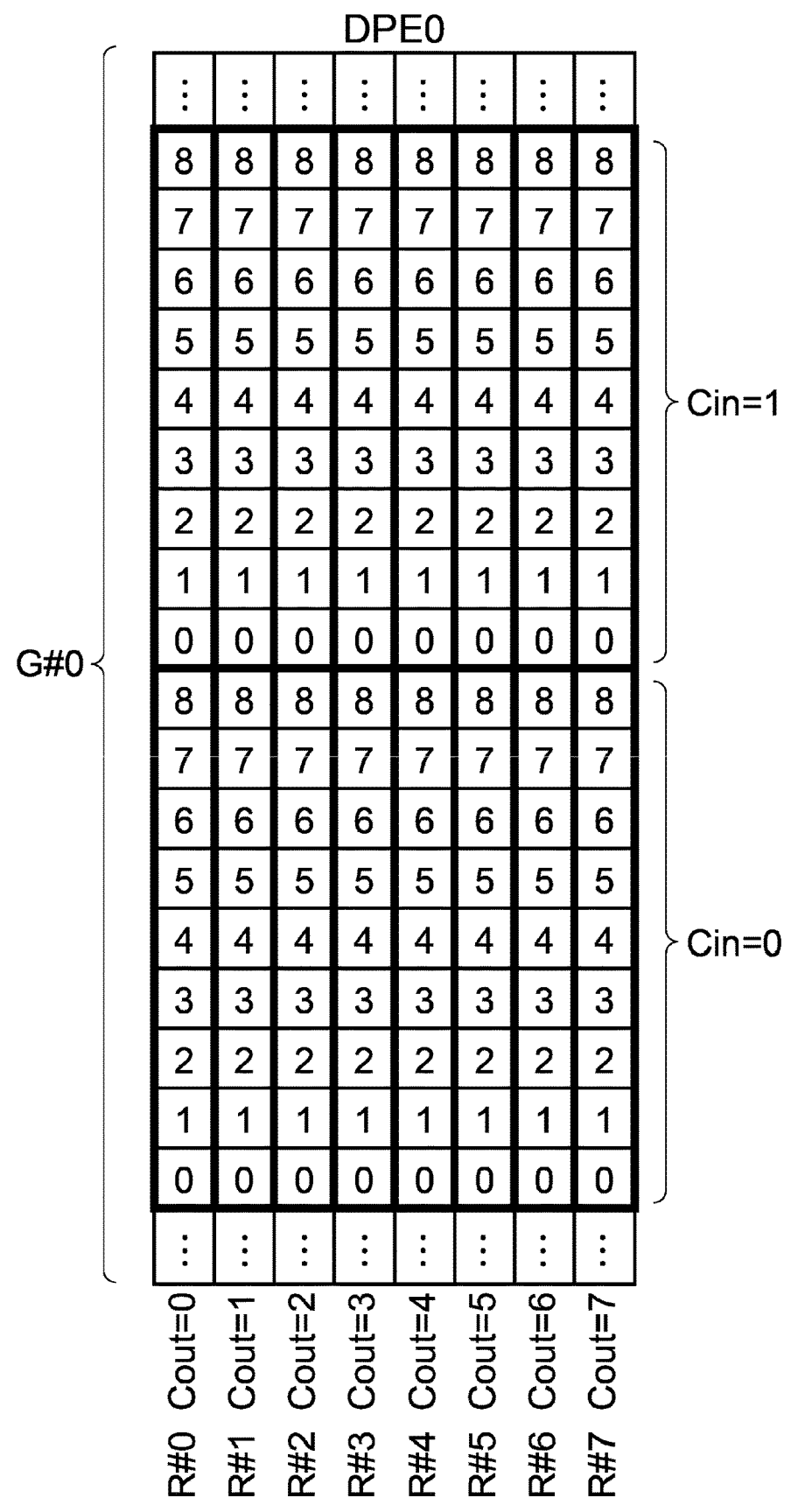

FIG. 16 illustrates the contents of the register G#0 of DPE0 after sorting.

As illustrated in FIG. 16, by sorting, the elements having the same value of Cout are stored in the same bank. For example, only the elements with Cout=0 are stored in the bank R#0.

Figure 17:
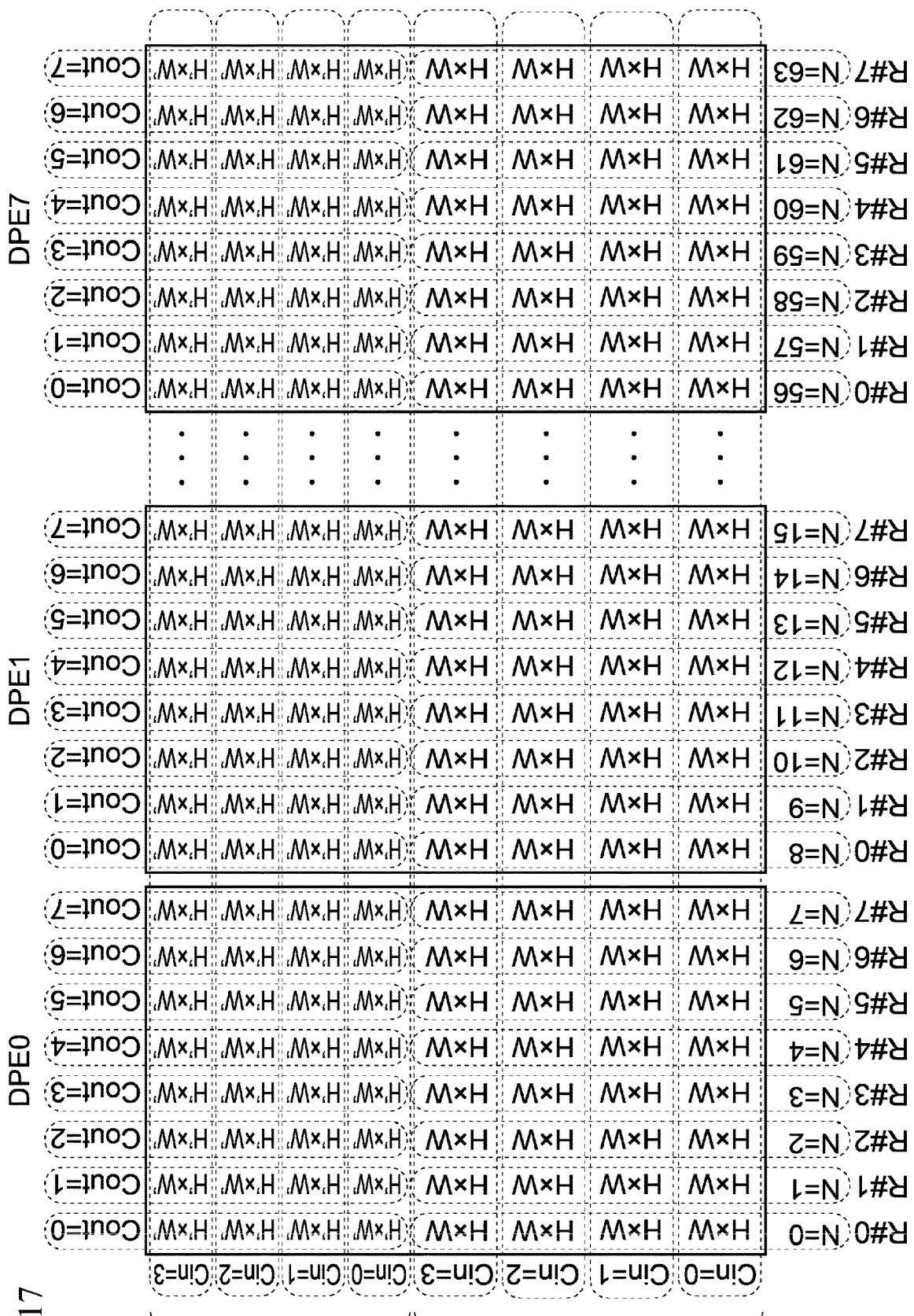
FIG. 17 illustrates the contents of the registers G#0 of DPE0 to DPE7 after sorting.

FIG. 17 illustrates the contents of the register G#0 of each of DPE0 to DPE7 after sorting as described above.

As illustrated in FIG. 17, for example, the elements with Cout=0 and Cin=0 to 3 of the array g are stored in the bank R#0 of DPE0. Moreover, the elements with N=0 and Cin=0 to 3 of the array d are stored in the bank R#0.

This makes the values of Cin of the arrays d and g in the bank R#0 the same, allowing the computation core C#0 to perform the convolution between the arrays d and g having the same value of Cin in accordance with the Winograd algorithm.

Each of the banks R#0 to R#7 corresponds one-to-one with the batch number N, and the convolutions with respect to different batch numbers are performed in the banks R#0 to R#7. The same applies to other DPE1 to DPE7.

Therefore, it is expected that the forward process and the backward process of deep learning are executed at high-speed by the parallel execution of the above-described convolution by the computation cores C#0 to C#7 of each of DPE0 to DPE7.

However, studies conducted by the inventor have revealed that the method in which each of the banks R#0 to R#7 is made to correspond one-to-one with the batch number N has the following problem.

Figure 18:
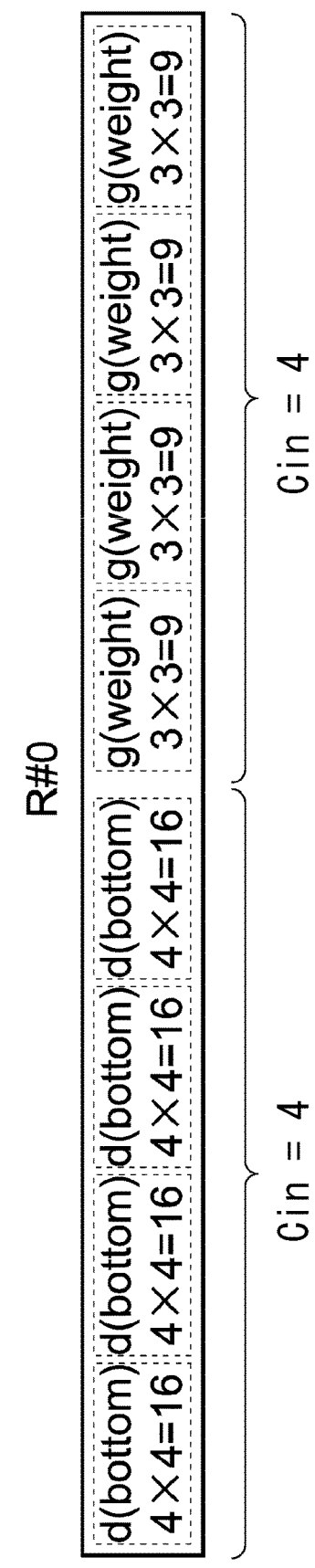
FIG. 18 is a schematic view of the bank R#0 of the register G#0 of DPE0.

FIG. 18 is a diagram for describing the problem, and is a schematic view of the bank R#0 of the register G#0 of DPE0.

In this example, each bank R#0 to R#7 is made to correspond one-to-one with the batch number N, and the sub-bottom matrix d and the weight matrix g having the same input channel number Cin are stored in one bank. Thus, it becomes necessary to store the same number of sub-bottom matrices d and weight matrices in one bank, and if the size of the sub-bottom matrix d is increased, the elements of the sub-bottom matrix d overflows from the bank.

For example, consider a case where four sub-bottom matrices d and four weight matrices g are stored in the bank R#0 as illustrated in FIG. 18. The size of the sub-bottom matrix d is t×t, and the size of the weight matrix g is 3×3. Thus, the number of elements to be stored in the bank R#0 is $4 \times t^2 + 4 \times 3^2$. As described above, since the number of sets of data that can be stored in one bank is 127, t needs to be 4 or less in order that the number of elements does not exceed 127.

When t is small, the size of the sub-top matrix y obtained by the equation (2) becomes small. Thus, a large number of sub-top matrices y need to be computed to obtain the top matrix, resulting in increase in computation time required for convolution. As a result, the characteristic of the Winograd algorithm, which can increase the computational speed of convolution, is not sufficiently utilized.

The following will describe embodiments that can compute convolution at high speed.

EMBODIMENT

Figure 19:
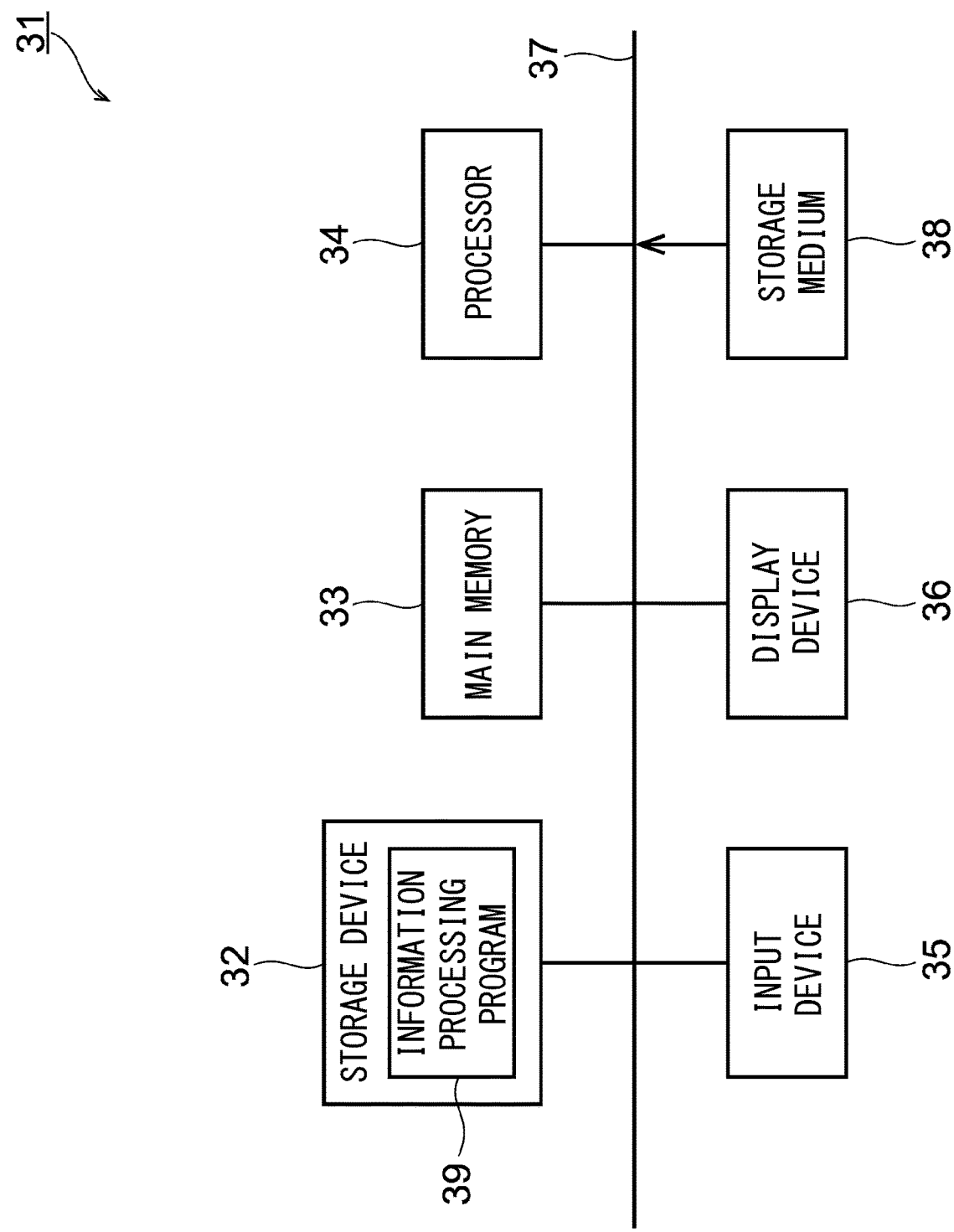
FIG. 19 is a hardware configuration diagram of an information processing device in accordance with an embodiment.

FIG. 19 is a hardware configuration diagram of an information processing device 31 in accordance with an embodiment.

The information processing device 31 is a computer such as a personal computer (PC) for generating programs executable by the computing machine 10 (see FIG. 5), and includes a storage device 32, a main memory 33, a processor 34, an input device 35, and a display device 36. These components are connected to each other through a bus 37.

The storage device 32 is a secondary storage device such as, but not limited to, a hard disk drive (HDD) or a solid state drive (SSD), and stores an information processing program 39 in accordance with the embodiment.

Execution of the information processing program 39 allows programs executable by the computing machine 10 (see FIG. 5) to be generated as described later.

It should be noted that the information processing program 39 may be stored in a storage medium 38 that is readable by a computer and the processor 34 may be caused to read the information processing program 39 in the storage medium 38.

Examples of the storage medium 38 include a physical portable storage medium such as, but not limited to, a compact disc-read only memory (CD-ROM), a digital versatile disc (DVD), and a universal serial bus (USB) memory. Alternatively, a semiconductor memory such as a flash memory or a hard disk drive may be used as the storage medium 38. These storage media 38 are not temporal storage media such as carrier waves that have no physical form.

Yet alternatively, the information processing program 39 may be stored in a device connected to a public network, the Internet, or a local area network (LAN), and the processor 34 may read the information processing program 39 and execute it.

On the other hand, the main memory 33 is a hardware device, such as a Dynamic Random Access Memory (DRAM), that temporarily stores data, and the information processing program 39 is expanded on the main memory 33.

The processor 34 is a hardware device that controls each component of the information processing device 31 and executes the information processing program 39 in cooperation with the main memory 33, such as a central processing unit (CPU).

The input device 35 is an input device such as a keyboard and a mouse operated by a user. The display device 36 is a display device, such as a liquid crystal display, that displays various commands used by the user during execution of the information processing program 39.

Figure 20:
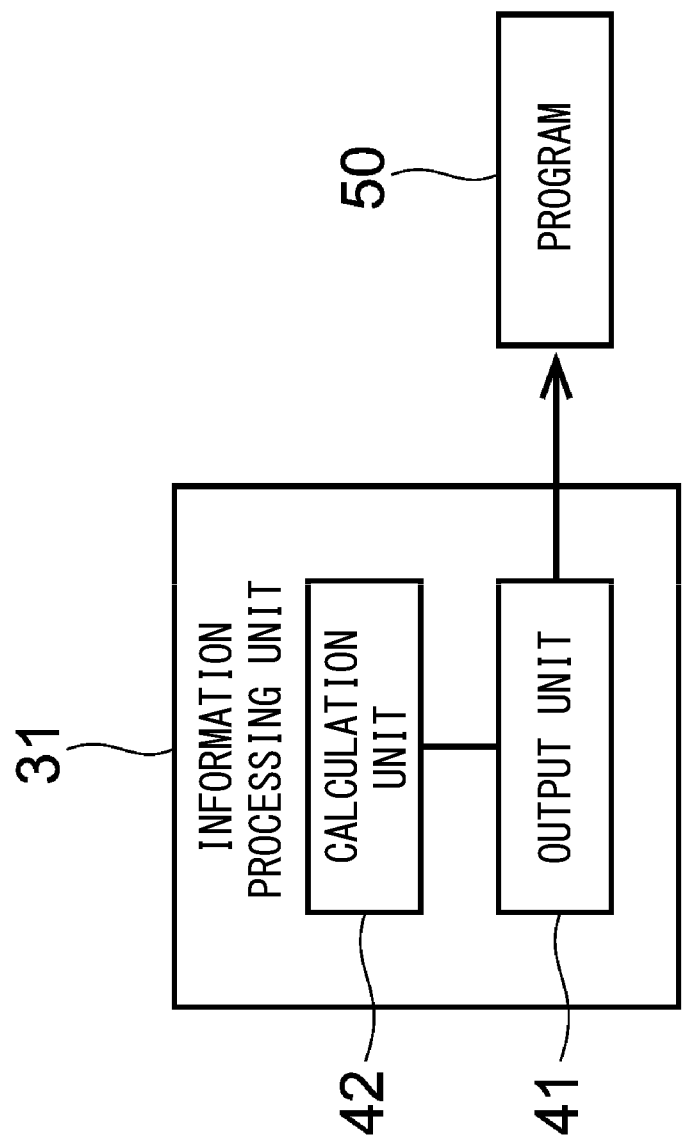
FIG. 20 is a functional configuration diagram of the information processing device in accordance with the embodiment.

FIG. 20 is a functional block diagram of the information processing device 31 in accordance with the embodiment. As illustrated in FIG. 20, the information processing device 31 includes an output unit 41 and a calculation unit 42. Each unit is implemented by the execution of the aforementioned information processing program 39 in cooperation between the processor 34 and the main memory 33.

The output unit 41 is a functional block that generates a program 50 executable by the computing machine 10 (see FIG. 5). The program may be a file in which an intermediate code is written or an executable binary file.

The calculation unit 42 is a functional block that optimizes various parameters in the program 50. Examples of the parameter includes a size t of the sub-bottom matrix d to be segmented from the bottom matrix as illustrated in FIG. 4A to FIG. 4C. In addition, the number q of banks described later is an example of the parameter to be optimized.

Figure 21:
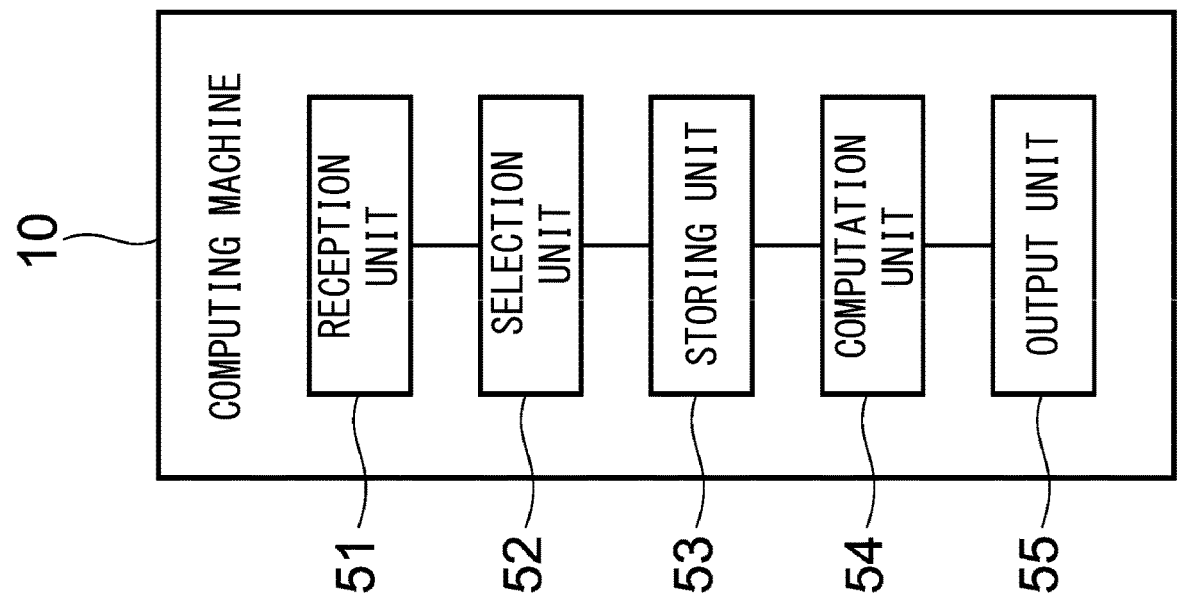
FIG. 21 is a functional block diagram of a computing machine.

FIG. 21 is a functional block diagram of the computing machine 10 implemented by execution of the program 50.

As illustrated in FIG. 21, the computing machine 10 includes a reception unit 51, a selection unit 52, a storing unit 53, a computation unit 54, and an output unit 55. These units are implemented by execution of the program 50 in cooperation between the main memory 11 and the DLU 12 in FIG. 5.

The reception unit 51 receives input of the bottom matrix and the weight matrix. The selection unit 52 selects the t×t sub-bottom matrix d from the bottom matrix as illustrated in FIG. 4A to FIG. 4C. As described above, the value of the size t is optimized by the calculation unit 42, and the selection unit 52 selects the sub-bottom matrix d by using the optimized size t.

The storing unit 53 stores the elements of each of the sub-bottom matrix d and the weight matrix g in the banks R#0 to R#7 of DPE0 to DPE7.

The computation unit 54 computes the convolution by using the elements stored in the banks R#0 to R#7. The output unit 55 outputs the sub-top matrix y (see FIG. 4A to FIG. 4C) that is the computational result of the convolution.

Next, the function of the storing unit 53 will be described in detail. The storing unit 53 is a functional block that stores the elements of each array read from the main memory 11 into the banks R#0 to R#7, but uses different storing methods between the forward process and the backward process.

Here, the forward process is described. In the case of the forward process, the storing unit 53 sorts the elements of each array read from the main memory 11 as presented by the following expression (5), and stores each element to the banks R#0 to R#7 of DPE0 to DPE7.

$$d[N_{major}][Cin_{major}][H][W][N_{minor}][Cin_{minor}]$$

$$g[Cout][Cin][H'][W']$$

$$y[N_{major}][Cout_{major}][H''][W''][N_{minor}][Cout_{minor}] \quad (5)$$

The array y is an array for storing the elements of the sub-top matrix obtained by convolution between the sub-bottom matrix d and the weight matrix g. Note that in this example, the weight matrix g is an example of a first matrix, and the t×t sub-bottom matrix d is an example of a second matrix.

In addition, (the number of Cin)=(the number of $Cin_{major}$)×(the number of $Cin_{minor}$). Thus, the input channel number Cin can be identified by the combination ($Cin_{major}$, $Cin_{minor}$). Therefore, hereinafter, the combination ($Cin_{major}$, $Cin_{minor}$) is equated with the input channel number Cin. For example, the array element with $Cin_{major}=0$, $Cin_{minor}=0$ corresponds to Cin=0, and the array element with $Cin_{major}=0$, $Cin_{minor}=1$ corresponds to Cin=1.

In the same manner, (the number of N)=(the number of $N_{major}$)×(the number of $N_{minor}$), and the batch number N can be identified by the combination ($N_{major}$, $N_{minor}$). Thus, hereinafter, the combination ($N_{major}$, $N_{minor}$) is equated with the batch number N. For example, the array element with $N_{major}=0$, $N_{minor}=0$ corresponds to N=0, and the array element with $N_{major}=0$, $N_{minor}=1$ corresponds to N=1.

According to the expression (5), one sub-bottom matrix d can be identified by identifying the input channel number Cin and the batch number N. The input channel number Cin in this example is an example of a first identifier that identifies the sub-bottom matrix d as described above. Similarly, the batch number N in this example is an example of a second identifier that identifies the sub-bottom matrix d.

In addition, in this example, it is assumed that the total number of $Cin_{minor}$ is 4, and the total number of $N_{minor}$ is 16. Furthermore, it is assumed that the total number of $Cin_{major}$ is 1, and the total number of $N_{major}$ is 4. Accordingly, the convolution is performed on the bottom matrices identified by 4 (=1×4) input channel numbers Cin of 256 input channel numbers Cin as illustrated in FIG. 2 and each of 64 (=4×16) batch numbers.

Furthermore, the elements [H][W] in the array d correspond to the elements of the t×t sub-bottom matrix d.

On the other hand, the elements [H'][W'] of the array g correspond to the elements of the 3×3 weight matrix g. In addition, it is assumed that the total number of the input channel numbers Cin of the array g is four, which is equal to the number of the input channel numbers of the array d. Furthermore, it is assumed that the total number of the output channel numbers Cout is eight.

Figure 22:
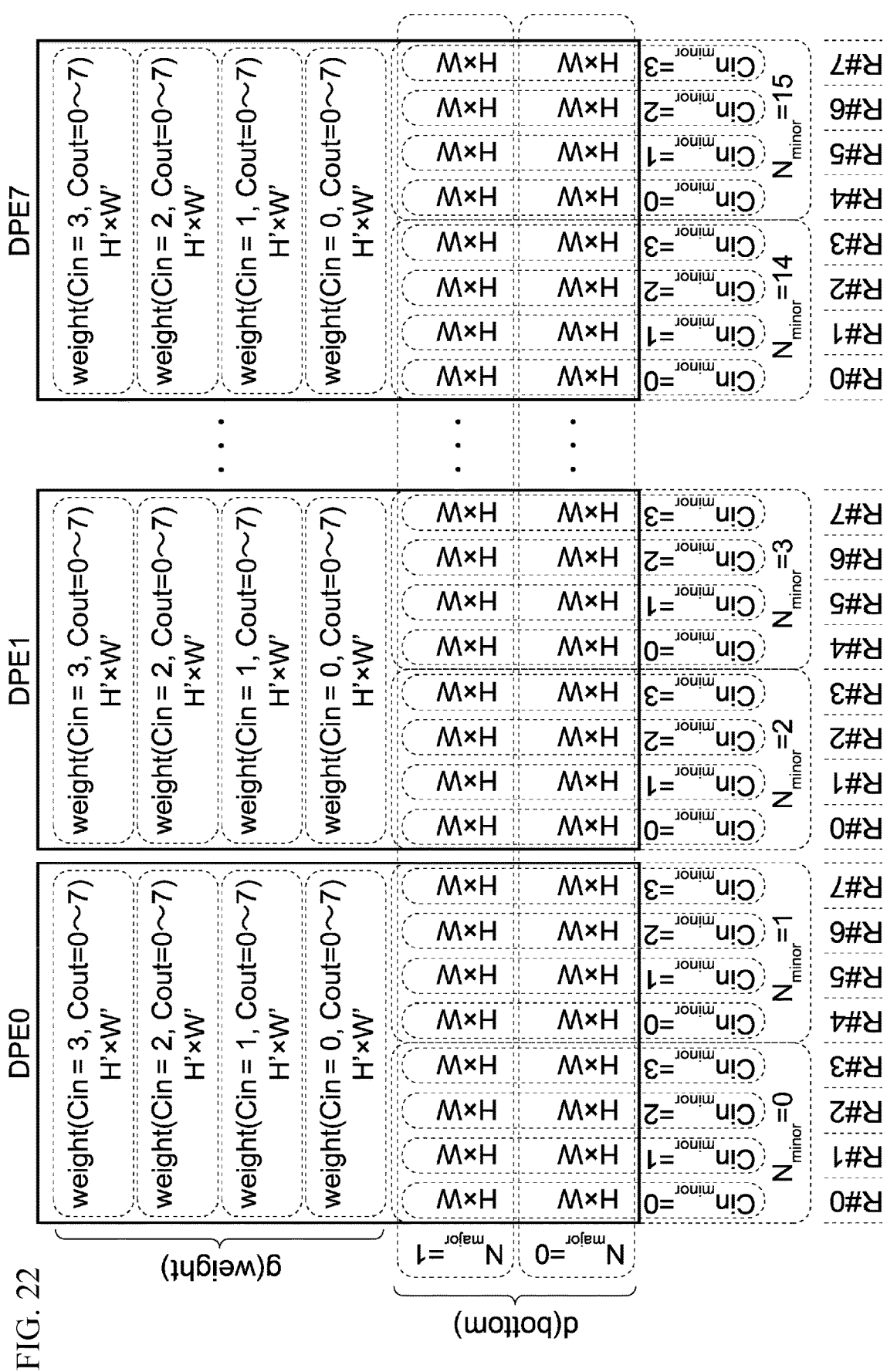
FIG. 22 illustrates the contents of the registers G#0 of DPE0 to DPE7 in which arrays d and g are stored by a storing unit when the forward process is performed in the embodiment.

FIG. 22 illustrates the contents of the registers G#0 of DPE0 to DPE7 in which each array d, g is stored by the storing unit 53 when the forward process is performed.

In DPE0, each of a plurality of computation cores computes the convolution between the matrices d and g stored in the corresponding bank of the banks R#0 to R#7. Since the convolution is computed in parallel in the plurality of computation cores, the computational speed of the convolution can be increased. This is also the case for the DPE1 to DPE7.

The array d of the arrays d and g is stored in the banks R#0 to R#7 of DPE0 to DPE7 by the sequential method in the same manner as FIG. 13. Here, only the arrays d with the same $Cin_{major}$ are stored in the banks R#0 to R#7 at one time. Then, after the convolution of the arrays d is finished, the arrays d with the different $Cin_{major}$ are stored in the banks R#0 to R#7 FIG. 22 assumes the case where the arrays d with $Cin_{major}=0$ are stored in the banks R#0 to R#7.

In this case, in the present embodiment, since $Cin_{minor}$ is the lowest-level index of the array d and $N_{minor}$ is the one-level higher index as presented by the expression (5), each bank corresponds one-to-one with $Cin_{minor}$ within the range of the same $N_{minor}$. Thus, when the total number of $Cin_{minor}$ is q (=4), q sub-bottom matrices d of which the input channel numbers ($Cin_{major}$, $Cin_{minor}$) are different from each other and the batch numbers ($N_{major}$, $N_{minor}$) are the same are stored in q banks in one DPE.

For example, in DPE0, four sub-bottom matrices d of which the batch numbers N are (0, 0) and the input channel numbers Cin are (0, 0), (0, 1), (0, 2), (0, 3) are stored in four (=q) banks R#0 to R#3.

Thus, unlike the case where the batch number N is changed with respect to each of the banks R#0 to R#7 as illustrated in FIG. 13, q computation cores can compute the convolution of q sub-bottom matrices d having the same batch number N in parallel.

On the other hand, the storing unit 53 stores the weight matrix g in each bank of DPE0 to DPE7 from the main memory 11 by the multicast method in the same manner as the example of FIG. 13.

Here, the storing unit 53 stores the weight matrix g having the same input channel number Cin as the sub-bottom matrix d in each bank of each of DPE0 to DPE7. By storing the matrices d and g of which the input channel numbers Cin are equal to each other in the same bank, the computation unit 54 can compute convolution between the matrices d and g of which the input channel numbers Cin are equal to each other as illustrated in FIG. 2.

However, when the array g is transferred to each bank by the multicast method, as described with reference to FIG. 15, the regularity between the input channel number Cin and the output channel Cout in one bank decreases. Thus, in the present embodiment, when the convolution is computed with the Winograd algorithm, the computation unit 54 sorts the elements of the array g as follows.

FIG. 23A to FIG. 25 illustrate the contents of the registers G#0 to G#3 of DPE0 when the computation unit 54 computes the convolution with the Winograd algorithm. In FIG. 23A to FIG. 25, only the banks R#0 of the registers G#0 to G#3 are illustrated to prevent the drawings from being complicating.

Figure 23A:
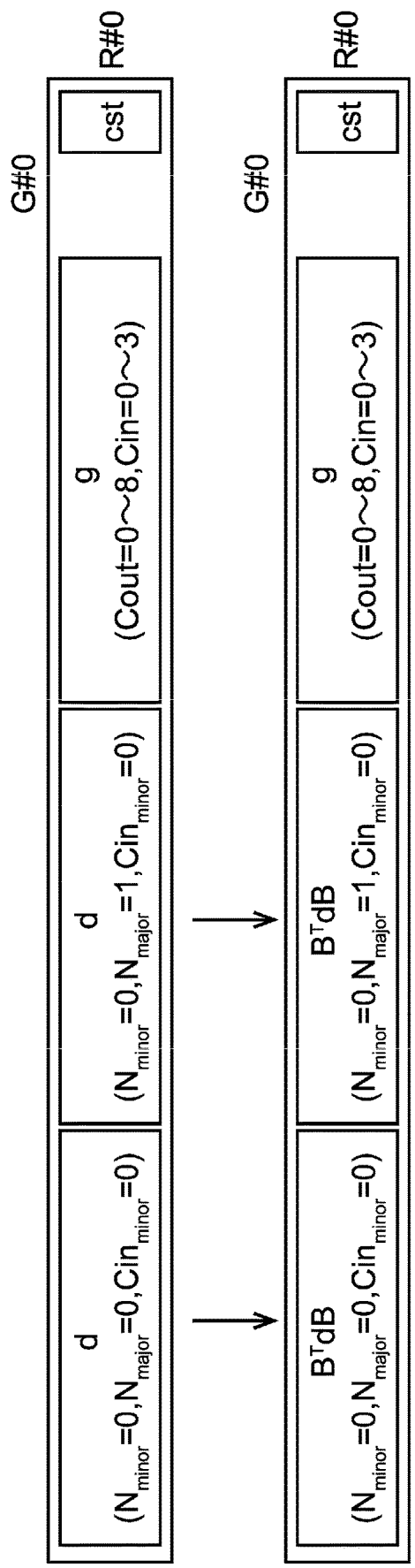
FIG. 23A and FIG. 23B are diagrams (No. 1) illustrating the contents of registers G#0 to G#3 of DPE0 when a computation unit performs the convolution with the Winograd algorithm in the embodiment.

Before the convolution is computed, as illustrated in FIG. 23A, the elements of the arrays d and g are stored in the bank R#0 of the register G#0. A plurality of arrays d having different batch numbers $N(=(N_{major}, N_{minor}))$ as described above is stored, as the array d, in the bank R#0.

Then, according to the equation (2), the array d is multiplied by the matrices $B^T$ and B from both sides of the array d, and the resulting matrix $B^TdB$ is stored in the line in which the array d is also stored. The elements of the matrices $B^T$ and B are stored in the constant area cst of the bank R#0.

At this point, the array g representing the weight matrix has disordered regularity as illustrated in FIG. 15.

Figure 23B:
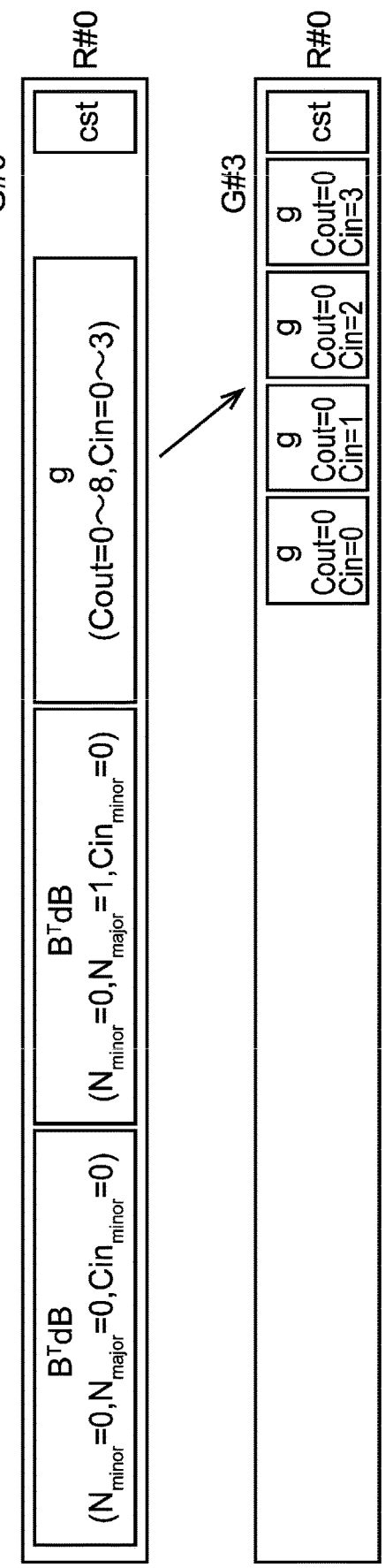

Thus, in the next step, as illustrated in FIG. 23B, the elements of the array g stored in the bank R#0 of the register G#0 are sorted by transferring each element to the bank R#0 of the register G#3.

In the register after sorting, as illustrated in FIG. 16, the banks R#0 to R#7 correspond one-to-one with the output channel numbers Cout, and only the elements of Cout=0 are stored in the bank R#0.

Figure 24:
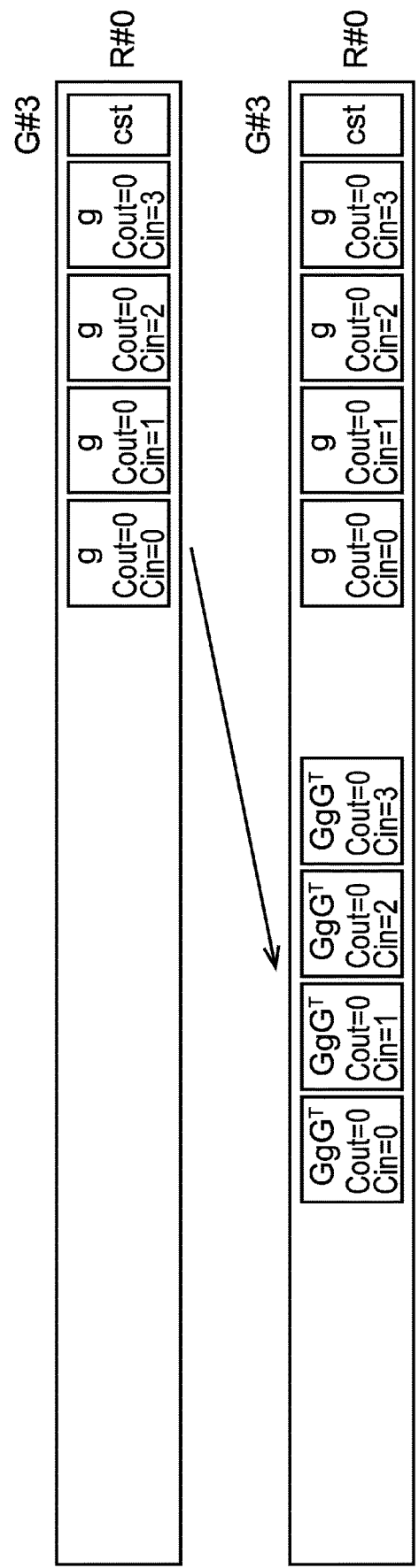
FIG. 24 is a diagram (No. 2) illustrating the contents of the registers G#0 to G#3 of DPE0 when the computation unit performs the convolution with the Winograd algorithm in the embodiment.

Then, as illustrated in FIG. 24, according to the equation (2), the array g is multiplied by the matrices G and $G^T$ from both sides of the array d, and the resulting matrix $GgG^T$ is stored in a free space of the bank. The elements of the matrices G and $G^T$ are stored in the constant area cst of the bank R#0.

Figure 25:
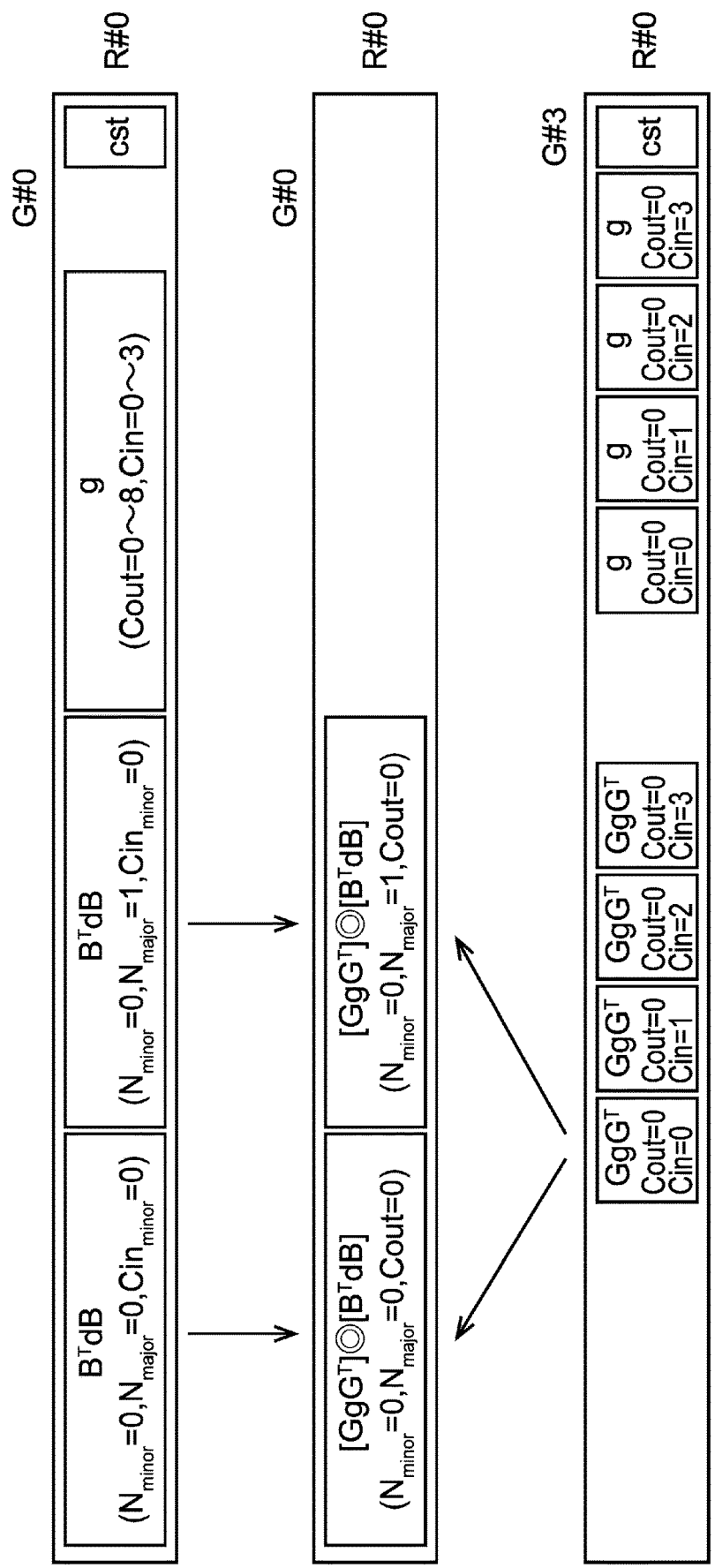
FIG. 25 is a diagram (No. 3) illustrating the contents of the registers G#0 to G#3 of DPE0 when the computation unit performs the convolution with the Winograd algorithm in the embodiment.

Then, as illustrated in FIG. 25, the element-wise multiplication "⊙" of the equation (2) is performed on two matrices $B^TdB$ in the bank R#0 of the register G#0 and one matrix $GdG^T$ in the bank R#0 of the register G#3.

The convolution is performed on two matrices having the same input channel number Cin as described with reference to FIG. 2. Thus, element-wise multiplication "⊙" is performed using the matrix with Cin=0 of four matrices $GdG^T$ in the bank R#0 of the register G#3 and two matrices $B^TdB$ with $Cin_{minor}=0$ in the bank R#0 of the register G#0.

Thereafter, $[GgG^T] \odot [B^TdB]$ is multiplied by the matrices $A^T$ and A from both sides of $[GgG^T] \odot [B^TdB]$ according to the equation (2) to obtain the sub-top matrix y.

Through the above processes, the computation of the convolution using the Winograd algorithm performed by the computation unit 54 is completed.

According to the aforementioned convolution computation, as illustrated in FIG. 23A, the bottom matrices with different batch numbers $N(=(N_{minor}, N_{major}))$ are stored in the bank R#0 of the register G#0.

Accordingly, the number of the sub-bottom matrices d stored in one bank is reduced compared to the example where a plurality of the sub-bottom matrices d with the same batch number N and different input channel numbers Cin are stored in the same bank as illustrated in FIG. 17. As a result, the size t of the bottom matrix d can be increased, and the convolution can be computed at high speed with the Winograd algorithm.

When the inventor made trial calculation for the case of t=6, the time required for convolution was 2304 cycles in the example of FIG. 3A to FIG. 3C that does not use the Winograd algorithm. In contrast, the computation time of the present embodiment was 1264 cycles, revealing that the computation speed is increased by 1.82(=2304:1264) times.

To further increase the computational speed of the convolution, the value of t is to be made to be as large as possible. However, when t is made to be too large, it becomes impossible to store the sub-bottom matrix d in each of the banks R#0 to R#7. On the other hand, when the value of t is small, the sub-bottom matrix d can be reliably stored in each of the banks R#0 to R#7, but the computation time of the convolution becomes long.

Thus, in the present embodiment, the optimal value of t is obtained as follows. First, the parameters are defined as follows.

p: the number of banks in one DPE
q: the number of banks in which the sub-bottom matrices d having the same $N_{minor}$ are stored in one DPE
R: the number of sets of data that one bank can store therein In the case of the example of FIG. 22, the tangible values of these parameters are as follows.

p: 8
q: 4
R: 128

Furthermore, the following parameters are defined.

Cin': the number of the input channel numbers Cin to be processed at one time in DPE0
Cout': the number of the output channel numbers Cout to be processed at one time in DPE0
N': the number of the batch numbers N to be processed at one time in DPE0 These parameters will be described with reference to the example of FIG. 22.

Cin' is the number of the input channel numbers Cin to be processed at one time in DPE0 as described above. The input channel number Cin is identified by the combination ($Cin_{major}$, $Cin_{minor}$). However, since only the arrays g and d of ($Cin_{major}$, $Cin_{minor}$)=(0, 0)(0, 1), (0, 2), and (0, 3) are processed in DPE0 in the example of FIG. 22, Cin'=4.

On the other hand, Cout' is the number of the output channel numbers Cout to be processed at one time in DPE0 as described above. In the example of FIG. 22, since eight weight matrices g with a value of Cout of 0 to 7 are stored in DPE0, Cout'=8.

Moreover, N' is the number of the batch numbers N to be processed at one time in DPE0 as described above. In the example of FIG. 22, since four sub-bottom matrices d of the combination ($N_{major}$, $N_{minor}$)=(0, 0), (0, 1), (1.0), (1, 1) are processed in DPE0, N'=4. Next, the computation time of the convolution will be examined.

First, the computation time when the matrix $B^T dB$ is obtained from the t×t sub-bottom matrix d as illustrated in FIG. 23A will be examined. To obtain the matrix $B^T dB$, for example, $B^T d$ is computed first, and then, the computational result is multiplied by the matrix B from the right of the computational result. To compute $B^T d$, the t×t sub-bottom matrix d is decomposed into t column vectors, and the products of the column vectors and the matrix $B^T$ are calculated.

Thus, in this example, the computation time required for calculating the product of one of the t column vectors, which constitute the t×t sub-bottom matrix d, and the matrix $B^T$ is represented by b(t). By using the function b(t), the computation time required for obtaining $B^T dB$ in one DPE is expressed by the following expression (6).

$$(t+t) \cdot b(t) \cdot Cin' \cdot N' \cdot \frac{1}{q} \quad (6)$$

The reason why the expression (6) includes "t" is because the computation time that is t times longer than the computation time expressed by the function b(t) is required because the matrix $B^T$ needs to be multiplied by the t column vectors of the sub-bottom matrix d to obtain $B^T d$. Similarly, the matrix $B^T d$ needs to be multiplied by the t column vectors of the matrix B to obtain the product of the matrices $B^T d$ and B. Thus, the total computation time becomes (t+t) times the computation time expressed by the function b(t). Therefore, the expression (6) includes the factor "t+t".

Moreover, as illustrated in FIG. 22, since Cin'·N' sub-bottom matrices d are in one DPE, the number of the sub-bottom matrices d per bank becomes Cin'·N'/q. Since each of the computation cores C#0 to C#7 needs to calculate $B^T dB$ with respect to each of Cin'·N'/q sub-bottom matrices d in the corresponding bank, the expression (6) includes the factor Cin'·N'/q.

Next, the computation time when the matrix $GgG^T$ is obtained from the 3×3 weight matrix g as illustrated in FIG. 24 will be examined.

To obtain the matrix $GgG^T$, for example, Gg is calculated first, and then, the computational result is multiplied by the matrix $G^T$ from the right of the computational result. To calculate Gg, the weight matrix g is decomposed into three column vectors, and the products of the column vectors and the matrix G are calculated.

Thus, in this example, the computation time required for obtaining the product of one of the three column vectors, which constitute the 3×3 weight matrix g, and the matrix G is represented by w(t). By using the function w(t), the computation time required for obtaining $GgG^T$ in one DPE is expressed by the following expression (7).

$$(3+t) \cdot w(t) \cdot Cin' \cdot Cout' \cdot \frac{1}{p} \quad (7)$$

The reason why the expression (7) includes "3" is because the computation time that is three times longer than computation time expressed by the function w(t) is required since the matrix G needs to be multiplied by the three column vectors of the weight matrix g to obtain the matrix Gg.

In addition, to obtain the product of the matrix Gg and the matrix $G^T$, the matrix Gg needs to be multiplied by the t column vectors of the matrix G. Thus, the total computation time becomes (t+3) times longer than the computation time expressed by the function w(t). Therefore, the expression (7) includes the factor "t+3".

In addition, as illustrated in FIG. 22, since Cin'·Cout' weight matrices g are in one DPE, the number of weight matrices g in one bank becomes Cin'·Cout'/p. Since each of the computation cores C#0 to C#7 needs to obtain $GgG^T$ with respect to each of Cin'·Cout'/p sub-bottom matrices d in the corresponding bank, the expression (7) includes the factor Cin'·Cout'/p.

Next, as illustrated in FIG. 25, the computation time required for performing element-wise multiplication between the matrices $B^T dB$ and $GgG^T$ will be examined.

As illustrated in FIG. 22, the number of sub-bottom matrices d stored in one DPE is N'·Cin'·Cout'/p. Moreover, the number of elements of the sub-bottom matrix d is $t^2$. Therefore, the number of times of multiplication when element-wise multiplication between the matrices $B^T dB$ and $GgG^T$ is performed is expressed by the following expression (8).

$$t^2 \cdot N' \cdot Cin' \cdot Cout' \cdot \frac{1}{p} \quad (8)$$

The expressions (6) to (8) are the computation time when N batch numbers are selected from N batch numbers, Cout' output channel numbers are selected from Cout output channel numbers, and Cin' input channel numbers are selected from Cin input channel numbers. Therefore, to compute the convolution between all bottom matrices and all weight matrices in FIG. 2, the computation needs to be performed as many times as the number of times expressed by the following expression (9).

$$\frac{HW}{(t-2)^2} \cdot \frac{Cin}{Cin'} \cdot \frac{N}{N'} \cdot \frac{Cout}{p} \quad (9)$$

The factor $HW/(t-2)^2$ in the expression (9) represents the total number of ways to segment the t×t submatrix from the H×W bottom matrix.

According to the aforementioned expressions (6) to (9), the computation time depends on not only t but also q. Thus, in the present embodiment, the computation time when the convolution is computed in one DPE is expressed by a first function f(t, q). The first function f(t, q) is expressed by the following expression (10) by multiplying the sum of the expressions (6) and (7) by the expression (9).

$$\frac{HW}{(t-2)^2} \cdot Cin \cdot \frac{N}{N'} \cdot \frac{Cout}{p} \left\{ 2tb(t)\frac{N'}{q} + (3+t)w(t)\frac{Cout'}{p} + t^2 N' \frac{Cout'}{p} \right\} \quad (10)$$

To reduce the computation time required for convolution, the combination of t and q that minimizes the value of the first function f(t, q) needs to be found under the condition that the number of elements of the weight matrices g and the sub-bottom matrices d does not exceed the number of elements that the register can store therein.

Thus, the number of elements of the sub-bottom matrices d and the weight matrices g will be examined next. First, the number of elements of the sub-bottom matrices d will be described.

The number $E_b$ of elements of the sub-bottom matrices d in one bank of one DPE is expressed by the following equation (11).

$$E_b = t^2 \cdot Cin' \cdot \frac{N'}{q} \quad (11)$$

In the equation (11), $t^2$ represents the number of elements of one sub-bottom matrix d. Cin'·N'/q represents the number of sub-bottom matrices d to be stored in one bank.

On the other hand, the number E of elements of the weight matrices g in one bank of one DPE is expressed by the following equation (12).

$$E_w = 3^2 \cdot Cin' \cdot \frac{Cout'}{p} \quad (12)$$

In the equation (12), $3^2$ is the number of elements of one weight matrix g. In addition, Cin'·Cout'/p is the number of weight matrices g to be stored in one bank.

Based on the equation (11) and the equation (12), a second function g(t, q) representing the total number of elements of the sub-bottom matrices d and the weight matrices g are expressed by the following equation (13).

$$g(t, q) = E_b + E_w = t^2 \cdot Cin' \cdot \frac{N'}{q} + 3^2 \cdot Cin' \cdot \frac{Cout'}{p} \quad (13)$$

As described above, the constraint condition expressed by the following equation (14) is obtained when the number of sets of data that one bank can store therein is R as described above.

$$g(t, q) = t^2 \cdot Cin' \cdot \frac{N'}{q} + 3^2 \cdot Cin' \cdot \frac{Cout'}{p} \leq R \quad (14)$$

Accordingly, the computational speed of the convolution can be increased by finding the combination of t and q that minimizes the value of the first function f(t, q) expressed by the expression (10) from among the combinations of t and q that satisfy the constraint condition of the equation (14).

Thus, in the present embodiment, the calculation unit 42 calculates the combination of t and q that minimizes the value of the first function f(t, q) expressed by the expression (10) from among the combinations of t and q that satisfy the constraint condition of the equation (14).

In the present embodiment, since R=128, the candidate combinations of t and q that satisfy the equation (14) are not so many. Therefore, the calculation unit 42 can find the combinations of t and q that satisfy the equation (14) by an exhaustive search, and can identify the combination that minimizes the value of the first function f(t, q) of the expression (10) from among the found combinations.

In the expression (10), b(t) and w(t) are treated as known functions. Here, b(t) and w(t) can be obtained as follows.

First, the method of obtaining w(t) will be described. As described above, w(t) is the computation time required for obtaining the product of one of the three column vectors, which constitute the 3×3 weight matrix g, and the matrix G when Gg is calculated. When t=6, the elements of the matrix G are expressed by the following equation (15).

$$G = \begin{pmatrix} \frac{1}{4} & 0 & 0 \\ -\frac{1}{6} & -\frac{1}{6} & -\frac{1}{6} \\ -\frac{1}{6} & \frac{1}{6} & -\frac{1}{6} \\ \frac{1}{24} & \frac{1}{12} & \frac{1}{6} \\ \frac{1}{24} & -\frac{1}{12} & \frac{1}{6} \\ 0 & 0 & 1 \end{pmatrix} \qquad (15)$$

This matrix G can be transformed into the following equation (16).

$$G = \begin{pmatrix} \frac{1}{4} & 0 & 0 \\ -\frac{1}{6} & -\frac{1}{6} & -\frac{1}{6} \\ -\frac{1}{6} & \frac{1}{6} & -\frac{1}{6} \\ \frac{1}{24} & \frac{1}{12} & \frac{1}{6} \\ \frac{1}{24} & -\frac{1}{12} & \frac{1}{6} \\ 0 & 0 & 1 \end{pmatrix} = \begin{pmatrix} \frac{1}{4} & 0 & 0 & 0 & 0 & 0 \\ 0 & -\frac{1}{6} & 0 & 0 & 0 & 0 \\ 0 & 0 & -\frac{1}{6} & 0 & 0 & 0 \\ 0 & 0 & 0 & \frac{1}{6} & 0 & 0 \\ 0 & 0 & 0 & 0 & \frac{1}{6} & 0 \\ 0 & 0 & 0 & 0 & 0 & 1 \end{pmatrix} \begin{pmatrix} 1 & 0 & 0 \\ 1 & 1 & 1 \\ 1 & -1 & 1 \\ \frac{1}{4} & \frac{1}{2} & 1 \\ \frac{1}{4} & -\frac{1}{2} & 1 \\ 0 & 0 & 1 \end{pmatrix} \qquad (16)$$

Two matrices in the right-hand side of the equation (16) are defined as the following equations (17) and (18).

$$G' = \begin{pmatrix} 1 & 0 & 0 \\ 1 & 1 & 1 \\ 1 & -1 & 1 \\ \frac{1}{4} & \frac{1}{2} & 1 \\ \frac{1}{4} & -\frac{1}{2} & 1 \\ 0 & 0 & 1 \end{pmatrix} \qquad (17)$$

$$G'' = \begin{pmatrix} \frac{1}{4} & 0 & 0 & 0 & 0 & 0 \\ 0 & -\frac{1}{6} & 0 & 0 & 0 & 0 \\ 0 & 0 & -\frac{1}{6} & 0 & 0 & 0 \\ 0 & 0 & 0 & \frac{1}{6} & 0 & 0 \\ 0 & 0 & 0 & 0 & \frac{1}{6} & 0 \\ 0 & 0 & 0 & 0 & 0 & 1 \end{pmatrix} \qquad (18)$$

Thus, to calculate Gg, G'g is calculated first, and then, the calculated G'g is multiplied by G″ from the left of G'g. Thus, the method of calculating G'g will be described.

Hereinafter, one column g' of the 3×3 weight matrix g will be described as $(g_0, g_1, g_2)^T$. Thus, G'g' can be expressed by the following equation (19)

$$G'g' = \begin{pmatrix} 1 & 0 & 0 \\ 1 & 1 & 1 \\ 1 & -1 & 1 \\ \frac{1}{4} & \frac{1}{2} & 1 \\ \frac{1}{4} & -\frac{1}{2} & 1 \\ 0 & 0 & 1 \end{pmatrix} \begin{pmatrix} g_0 \\ g_1 \\ g_2 \end{pmatrix} = \begin{pmatrix} x_0 \\ x_1 \\ x_2 \\ x_3 \\ x_4 \\ x_5 \end{pmatrix} \qquad (19)$$

Here, $(x_0, x_1, x_2, x_3, x_4, x_5)^T$ is a variable that stores each element of G'g' therein.

Here, to perform the calculation of the equation (19), six array elements a[0], a[1], a[2], a[3], a[4], and a[5] are prepared. Then, $g_0$, $g_1$, and $g_2$ are stored in a[0], a[1], and a[2], respectively. Then, two array elements b[0] and b[1] are prepared as buffers for calculation.

In this case, the equation (19) can be calculated by plugging in a value for each array element in the order of FIG. 26.

FIG. 26 is a schematic view illustrating the calculation of the equation (19) in the order of steps. Here, in FIG. 26 is a comment statement indicating the meaning of each step. The same applies to FIG. 27 described later.

When the calculation is performed according to the sequence illustrated in FIG. 26, (a[0], a[1], a[2], a[3], a[4], a[5])=($x_0$, $x_1$, $x_5$, $x_2$, $x_4$, $x_3$) eventually, and the computational result of G'g' can be stored in each of the array elements a[0], a[1], a[2], a[3], a[4], and a[5].

G'g' can be calculated in eight steps. Thus, w(6)=8. Even when the value of t differs from 6, the value of w(t) can be obtained in the same manner as described above.

Next, the method of obtaining b(t) will be described. As described above, b(t) is the computation time required for obtaining the product $B^T d$ of one of the t column vectors, which constitute the t×t sub-bottom matrix d, and the matrix $B^T$. When t=6, the elements of the matrix $B^T$ are expressed by the following equation (20).

$$B^T = \begin{pmatrix} 4 & 0 & -5 & 0 & 1 & 0 \\ 0 & -4 & -4 & 1 & 1 & 0 \\ 0 & 4 & -4 & -1 & 1 & 0 \\ 0 & -2 & -1 & 2 & 1 & 0 \\ 0 & 2 & -1 & -2 & 1 & 0 \\ 0 & 4 & 0 & -5 & 0 & 1 \end{pmatrix} \qquad (20)$$

Moreover, hereinafter, one column d' of the 6×6 sub-bottom matrix d is described as $(d_0, d_1, d_2, d_3, d_4, d_5)^T$. In this case, $B^T d'$ can be expressed by the following equation (21), $$B^T d' = \begin{pmatrix} 4 & 0 & -5 & 0 & 1 & 0 \\ 0 & -4 & -4 & 1 & 1 & 0 \\ 0 & 4 & -4 & -1 & 1 & 0 \\ 0 & -2 & -1 & 2 & 1 & 0 \\ 0 & 2 & -1 & -2 & 1 & 0 \\ 0 & 4 & 0 & -5 & 0 & 1 \end{pmatrix} \begin{pmatrix} d_0 \\ d_1 \\ d_2 \\ d_3 \\ d_4 \\ d_5 \end{pmatrix} = \begin{pmatrix} x_0 \\ x_1 \\ x_2 \\ x_3 \\ x_4 \\ x_5 \end{pmatrix} \qquad (21)$$

Here, $(x_0, x_1, x_2, x_3, x_4, x_5)^T$ is a variable that stores the elements of $B^T d'$ therein.

Here, to calculate the equation (21), six array elements a[0], a[1], a[2], a[3], a[4], and a[5] are prepared, and $d_0$, $d_1$, $d_2$, $d_3$, $d_4$, and $d_5$ are respectively stored in the array elements a[0], a[1], a[2], a[3], a[4], and a[5] in advance.

In addition, four array elements b[0], b[1], b[2], and b[3] are prepared as buffers for calculation.

In this case, the equation (21) can be calculated by plugging in a value for each array element in the order of FIG. 27.

FIG. 27 is a schematic view illustrating the calculation of the equation (21) in the order of steps. When the calculation is performed in the sequence illustrated in FIG. 27, (a[0], a[1], a[2], a[3], a[4], a[5])=($x_0$, $x_1$, $x_2$, $x_3$, $x_4$, $x_5$) eventually, and the computational result of $B^T d'$ can be stored in each of the array elements a[0], a[1], a[2], a[3], a[4], and a[5].

Thus, $B^T d'$ can be calculated in 15 steps. Therefore, b(6)=15. Even when the value of t differs from 6, the value of b(t) can be obtained in the same manner as described above.

Based on the facts described above, the information processing device 31 in accordance with the present embodiment executes the following information processing method.

Figure 28:
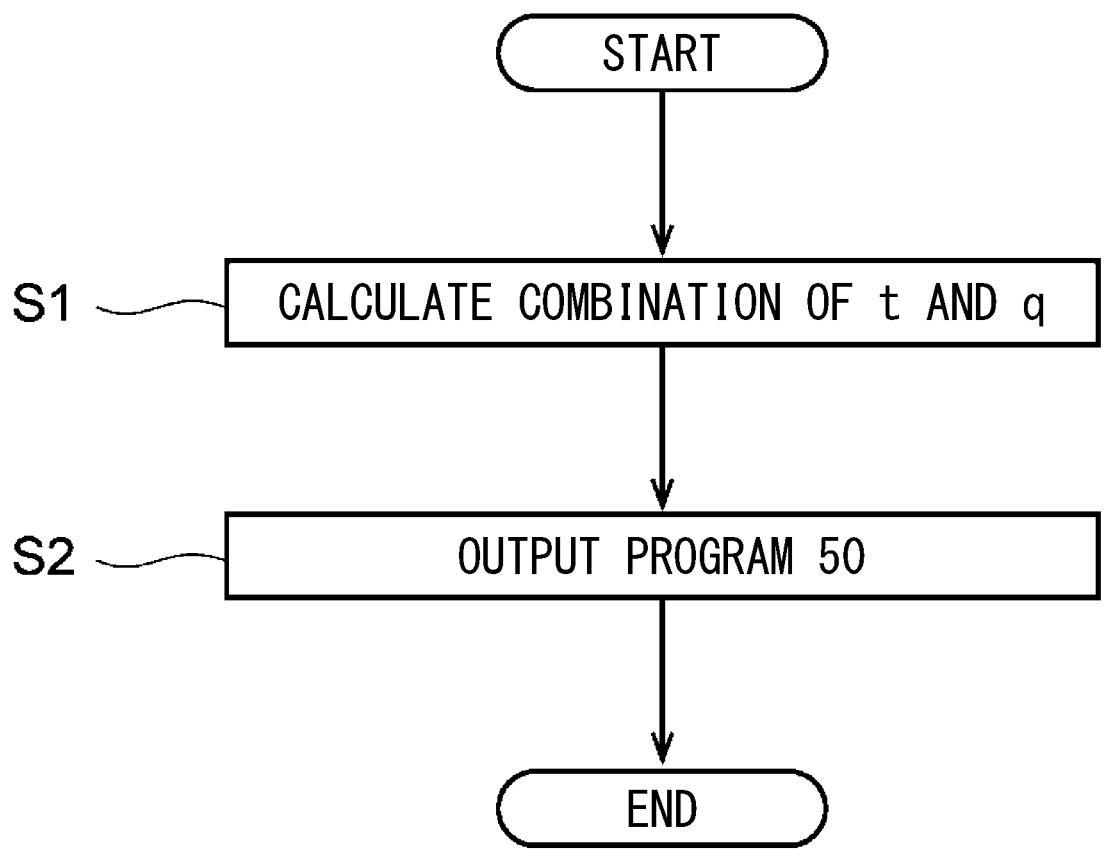
FIG. 28 is a flowchart of an information processing method in accordance with the embodiment.

FIG. 28 is a flowchart of an information processing method in accordance with the present embodiment. First, in step S1, the calculation unit 42 (see FIG. 20) calculates the combination of t and q. For example, the calculation unit 42 calculates the combination that minimizes the value of the first function f(t, q) of the expression (10) among the combinations of t and q that satisfy the constraint condition of the equation (14). This allows the combination that minimizes the computation time to be obtained from among the combinations of t and q that allow the elements of the weight matrix g and the t×t sub-bottom matrix d to be stored in q banks.

Then, in step S2 the output unit 41 (see FIG. 20) outputs the program 50 executable by the computing machine 10 (see FIG. 5).

The combination of t and q calculated in step S1 is used in the program 50. For example, when the computing machine 10 executes the program 50, the selection unit 52 (see FIG. 21) selects the t×t sub-bottom matrix d from the bottom matrix.

Then, the storing unit 53 stores the t×t sub-bottom matrix d and the weight matrix g in q banks of the banks R#0 to R#7 of DPE0. Thereafter, the computation unit 54 computes the convolution between the sub-bottom matrix d and the weight matrix g with use of the Winograd algorithm according to the procedures of FIG. 23A to FIG. 25.

Through the above process, the basic steps of the information processing method in accordance with the present embodiment are completed.

According to the embodiment described above, the calculation unit 42 calculates the combination of t and q that minimizes the first function f(t, q) that represents the computation time of the convolution under the constraint condition of the equation (14) that the sub-bottom matrix d and the weight matrix g can be stored in one bank.

Therefore, the convolution can be computed at high speed with use of the sub-bottom matrix d and the weight matrix g while the sub-bottom matrix d and the weight matrix g are stored in the bank of the register.

Backward Process

In the example of FIG. 22, the convolution in the forward process of deep learning is computed with the Winograd algorithm.

Hereinafter, the Winograd algorithm in the backward process of deep learning will be described. The backward process includes a process of obtaining the bottom matrix by convolution between the top matrix and the weight matrix and a process of obtaining the weight matrix by convolution between the top matrix and the bottom matrix.

First, the process of obtaining the bottom matrix by convolution between the top matrix and the weight matrix will be described.

Figure 29A:
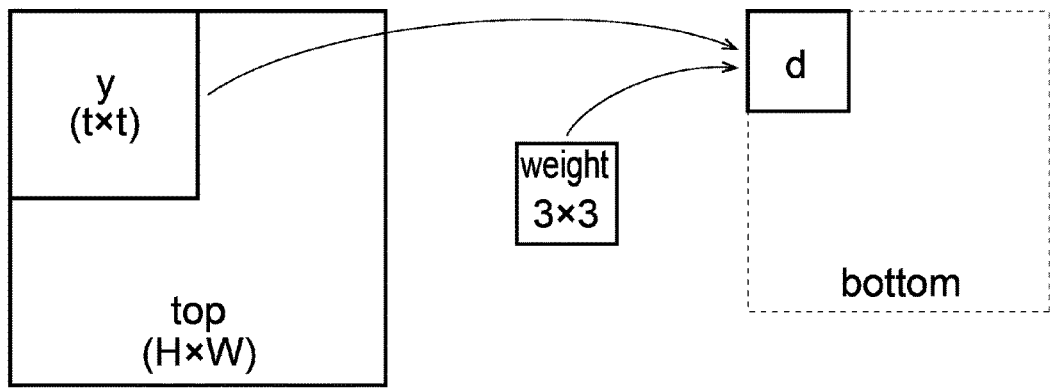
FIG. 29A to FIG. 29C are schematic views when the convolution between a top matrix and a weight matrix is performed with the Winograd algorithm in a backward process in accordance with the embodiment.
Figure 29B:
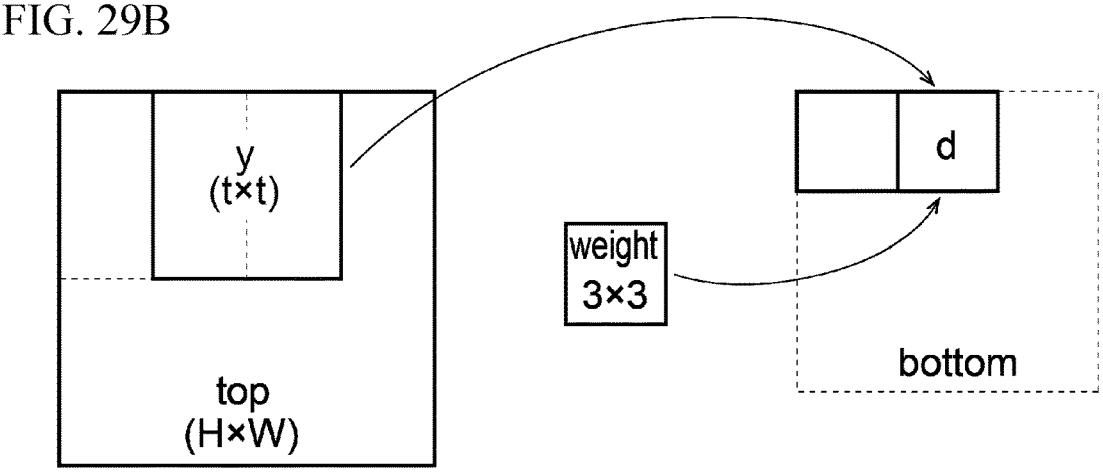
Figure 29C:
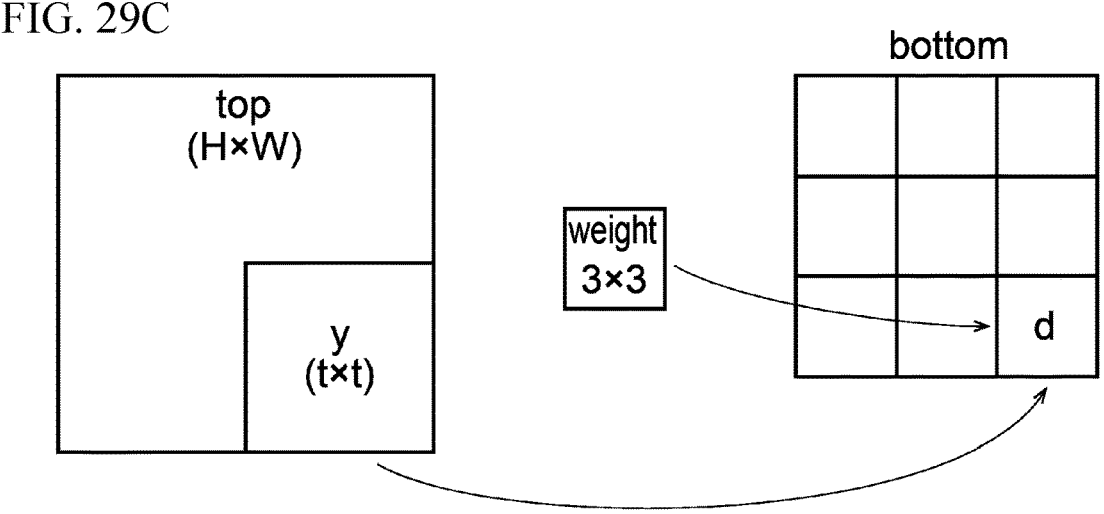

FIG. 29A to FIG. 29C are schematic views when the convolution between the top matrix and the weight matrix is computed with the Winograd algorithm in the backward process.

First, as illustrated in FIG. 29A, the selection unit 52 (see FIG. 21) selects the t×t sub-top matrix y from the H-row W-column top matrix.

Then, according to the following equation (22), the computation unit 54 obtains the sub-bottom matrix d by convolution between the weight matrix g and the sub-top matrix y.

$$d = A^T \{(GgG^T) \odot (B^T yB)\} A \qquad (22)$$

Then, as illustrated in FIG. 29B, the position in which the sub-top matrix y is segmented from the top matrix is shifted by two columns from the position of the case in FIG. 29A, and the segmented sub-top matrix y undergoes the same calculation as described above. The resulting sub-bottom matrix d forms a block next to the sub-bottom matrix d obtained in FIG. 29A in the bottom matrix.

As described above, by repeatedly shifting the position in which the sub-top matrix y is segmented from the matrix by two in columns and rows, the bottom matrix formed from the sub-bottom matrices d is obtained as illustrated in FIG. 29C.

Through the above steps, the computation of convolution between the top matrix and the weight matrix in the backward process is completed. In this example, the weight matrix g is an example of a first matrix, and a t×t sub-top matrix y is an example of the second matrix.

Next, the function of the storing unit 53 when the backward process is performed in the aforementioned manner will be described in detail.

The storing unit 53 sorts the elements of each array as expressed by the following expression (23), and stores the elements in the banks R#0 to R#7 of DPE0 to DPE7.

$d[N_{major}][Cin_{major}][H][W][N_{minor}][Cin_{major}]$ $g[Cout][Cin][H'][W']$ $y[N_{major}][Cout_{major}][H''][W''][N_{minor}][Cout_{major}] \qquad (23)$ Here, when N is a batch number, (the number of N)=(the number of $N_{major}$)×(the number of $N_{minor}$), (the number of Cout)=(the number of $Cout_{major}$)×(the number of $Cout_{minor}$). In this case, as with the expression (5), the batch number N is identified by the combination ($N_{major}$, $N_{minor}$). In the backward process, the batch number N is an example of a second identifier for identifying the sub-top matrix y.

The output channel number Cout is also identified by the combination ($Cout_{major}$, $Cout_{minor}$). For example, the array element of $Cout_{major}$=0, $Cout_{minor}$=0 corresponds to Cout=0, and the array element of $Cout_{major}$=0, $Cout_{minor}$=1 corresponds to Cout=1. In addition, in the backward process, the output channel number Cout is a first identifier for identifying the sub-top matrix y.

Furthermore, in this example, as in FIG. 2, it is assumed that the total number of the batch numbers N is 64 and the total number of the output channel numbers Cout is 384. It is also assumed that the total number of $N_{major}$ is 16 and the total number of $Cout_{minor}$ is 4.

The elements [H''][W''] in the array y correspond to the elements of the t×t sub-top matrix y.

Figure 30:
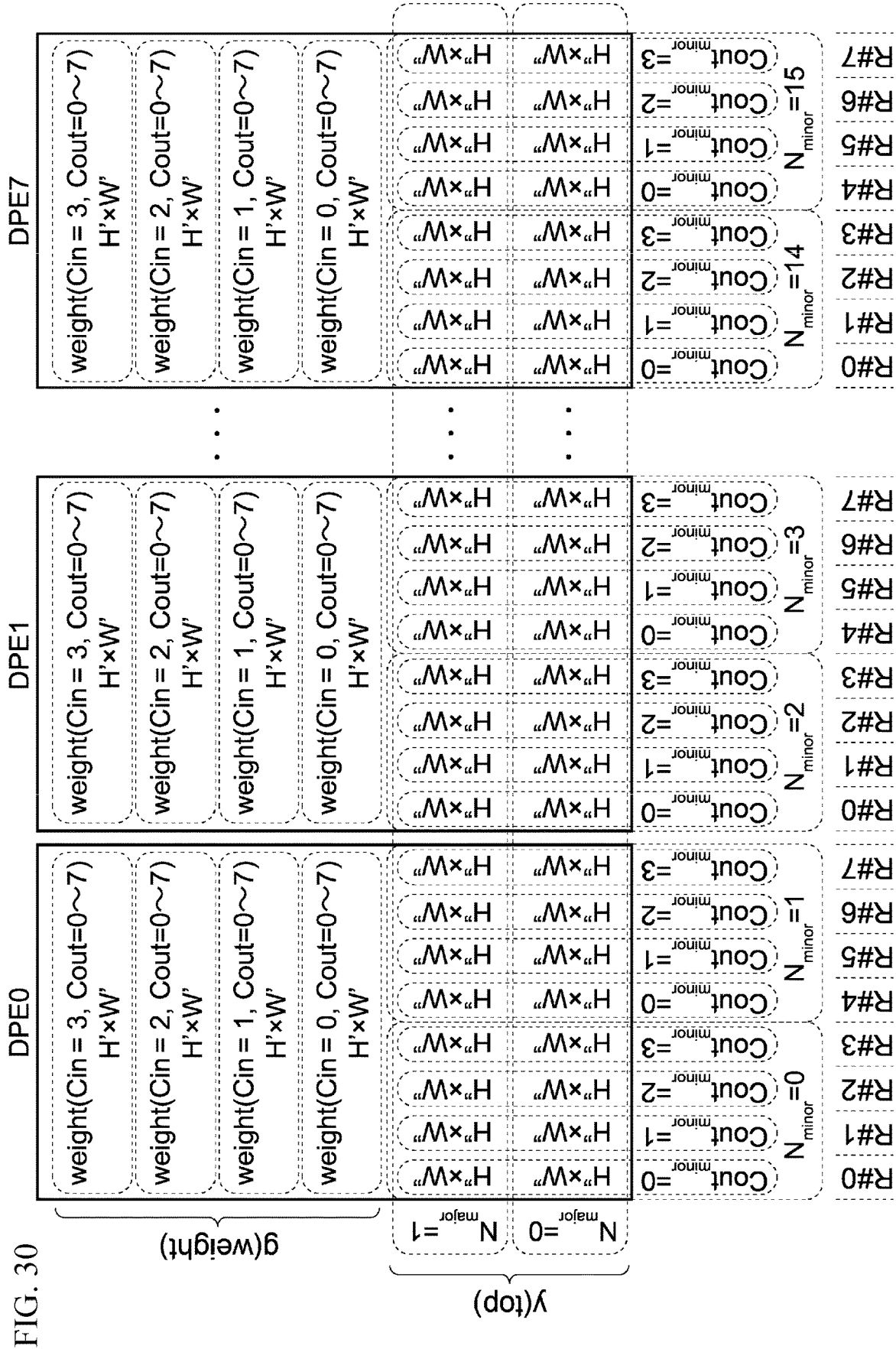
FIG. 30 illustrates the contents of the registers G#0 of DPE0 to DPE7 in which arrays y and g are stored by the storing unit in accordance with the embodiment.

FIG. 30 illustrates the contents of the registers G#0 of DPE0 to DPE7 in which the arrays y and g are stored by the storing unit 53.

The army y is stored in the banks R#0 to R#7 of DPE0 to DPE7 by the sequential method by the storing unit 53.

In this case, in the present embodiment, $Cout_{minor}$ is the lowest-level index of the array y and $N_{minor}$ is the next higher level index as presented in the expression (23). Thus, each bank corresponds one-to-one with $Cout_{minor}$ within the range of the same $N_{minor}$. Thus, when the total number of $Cout_{minor}$ is q(=4), the q sub-top matrices y with different output channel numbers ($Cout_{major}$, $Cout_{minor}$) and the same batch number ($N_{major}$, $N_{minor}$) are stored in q banks in one DPE.

For example, in DPE0, four sub-top matrices y of which the batch number N is (0, 0) and the output channel number Cout is (0, 0), (0, 1) (0, 2), (0, 3) are stored in four banks R#0 to R#3, respectively.

Thus, unlike the example where the batch number N is changed with respect to each bank R#0 to R#7 as illustrated in FIG. 13, the convolution of the q sub-top matrices y having the same batch number N can be computed in the q computation cores in parallel.

On the other hand, the weight matrix g is transferred, by the storing unit 53, from the main memory 11 to DPE0 to DPE7 by the multicast method as in the example of FIG. 22.

As described with reference to FIG. 15, in the multicast method, there is no regularity between the values of the input channel number Cin and the output channel Cout. Thus, also in this example, the computation unit 54 sorts the array g as in FIG. 23A to FIG. 25.

Next, the computation time of the convolution in this backward process will be examined.

The computation time required for obtaining $B^T y B$ expressed by the equation (22) in one DPE can be expressed by the following expression (24) by substituting Cin' in the expression (6) with Cout'.

$$(t+t) \cdot b(t) \cdot Cout' \cdot N' \cdot \frac{1}{q} \quad (24)$$

In addition, the computation time required for obtaining $GgG^T$ expressed by the equation (22) in one DPE can be expressed by the expression (25) because of the same reason as the expression (7).

$$(3+t) \cdot w(t) \cdot Cin' \cdot Cout' \cdot \frac{1}{p} \quad (25)$$

Furthermore, the number of times of multiplication when element-wise multiplication between the matrices $B^T y B$ and $GgG^T$ is performed in the equation (22) is expressed by the following expression (26) as with the expression (8).

$$t^2 \cdot N' \cdot Cin' \cdot Cout' \cdot \frac{1}{p} \quad (26)$$

To compute the convolution between all top matrices and all weight matrices, computation needs to be performed as many times as the number of times expressed by the following expression (27), in which p in the expression (9) is substituted with Cout'.

$$\frac{HW}{(t-2)^2} \cdot \frac{Cin}{Cin'} \cdot \frac{N}{N'} \cdot \frac{Cout}{cout'} \quad (27)$$

The first function f(t, q) representing the computation time when the convolution is computed in one DPE can be expressed by the following equation (28) by multiplying the sum of the expressions (24) to (26) by the expression (27).

$$f(t,q) = \frac{HW}{(t-2)^2} \cdot \frac{N}{N'} \cdot Cout \cdot \frac{1}{p}\left\{\frac{2tb(t)N'Cin'p}{q} + (3+t)w(t) + t^2 N'\right\} \quad (28)$$

Next, the condition that the number of elements of the sub-top matrices y and the weight matrices g does not exceed the number of elements that the register can store therein will be examined. First, the number of elements of the sub-top matrix y will be described.

The number $E_y$ of elements of the sub-top matrices y in one bank of one DPE can be expressed by the following equation (29) by substituting Cin' in the equation (11) with Cout'.

$$E_y = t^2 \cdot Cout' \cdot \frac{N'}{q} \quad (29)$$

On the other hand, the number $E_w$ of elements of the weight matrices g in one bank of one DPE can be expressed by the following equation (30) as with the equation (12).

$$E_w = 3^2 \cdot Cin' \cdot \frac{Cout'}{p} \quad (30)$$

Based on the equation (29) and the equation (30), the second function g(t, q) representing the total number of elements of the sub-top matrices y and the weight matrices g can be expressed by the following equation (31).

$$g(t,q) = E_y + E_w = t^2 \cdot Cout' \cdot \frac{N'}{q} + 3^2 \cdot Cin' \cdot \frac{Cout'}{p} \quad (31)$$

Thus, when the number of sets of data stored in one bank is R, the constraint condition expressed by the following equation (32) is obtained.

$$g(t,q) = E_y + E_w = t^2 \cdot Cout' \cdot \frac{N'}{q} + 3^2 \cdot Cin' \cdot \frac{Cout'}{p} \leq R \quad (32)$$

Accordingly, the computational speed of the convolution can be increased by finding the combination of t and q that minimizes the value of the first function (t, q) of the equation (28) from among the combinations of t and q that satisfy the constraint condition of the equation (32).

Thus, when the backward process for obtaining the sub-bottom matrix d by convolution between the top matrix and the weight matrix is performed, the calculation unit 42 identifies the combinations of t and q that satisfy the constraint condition of the equation (32). Then, the calculation unit 42 calculates the combination of t and q that minimizes the value of the first function f(t, q) of the equation (28) from among the identified combinations to increase the computational speed of the convolution.

Next, the backward process for obtaining the weight matrix by convolution between the top matrix and the bottom matrix will be described.

Figure 31A:
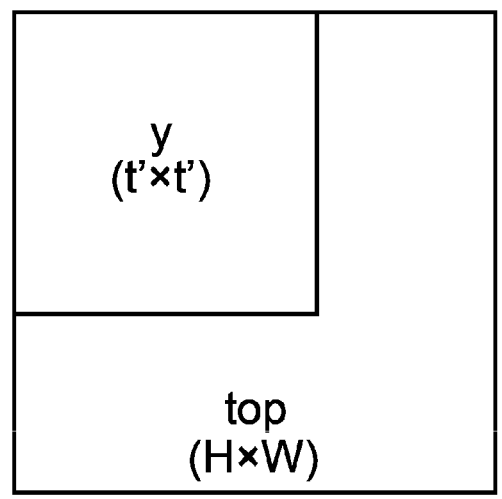
FIG. 31A and FIG. 31B are schematic views of the convolution between the top matrix and a bottom matrix performed with the Winograd algorithm in the backward process in accordance with the embodiment.

FIG. 31A to FIG. 32C are schematic views when the convolution between the top matrix and the bottom matrix is computed with the Winograd algorithm in the backward process First, as illustrated in FIG. 31A, the selection unit 52 selects the t'×t' sub-top matrix y from the H×W top matrix.

Figure 31B:
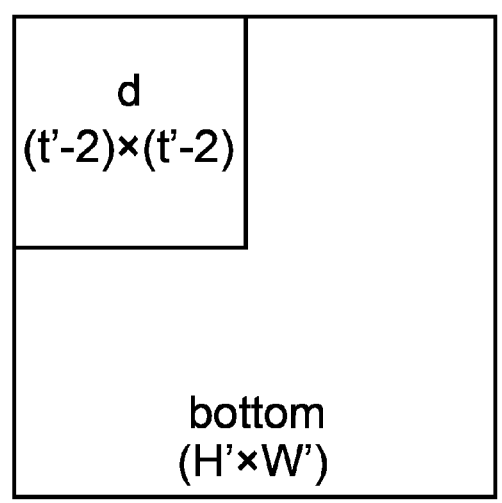

Then, as illustrated in FIG. 31B, the selection unit 52 selects the (t'−2)×(t'−2) sub-bottom matrix d from the H'×W' bottom matrix.

Figure 32A:
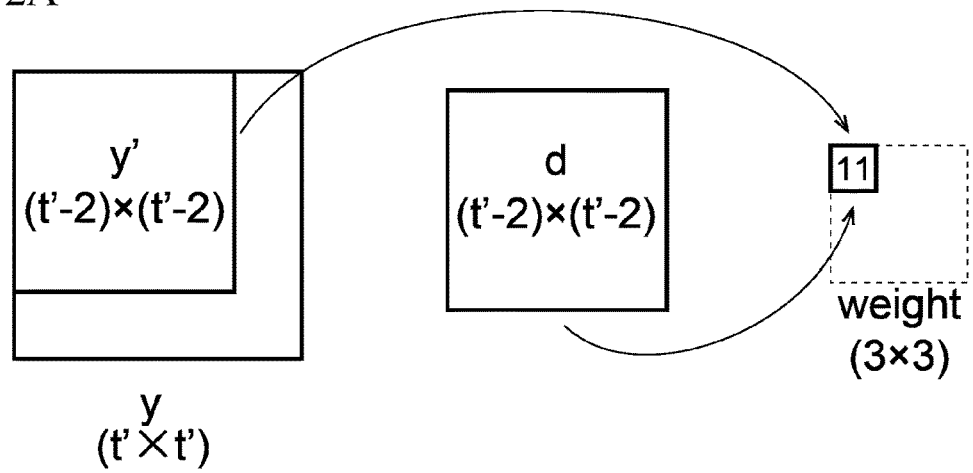
FIG. 32A to FIG. 32C are schematic views of the convolution between the top matrix and the bottom matrix performed with the Winograd algorithm in the backward process in accordance with the embodiment.

Then, as illustrated in FIG. 32A, the computation unit 54 selects the (t'−2)×(t'−2) matrix y' from the sub-top matrix y. Then, the computation unit 54 obtains 11 components of the weight matrix g according to the following equation (33).

$$g_{11} = A^T\{(Gy'G^T) \odot (B^T dB)\}A \quad (33)$$

Figure 32B:
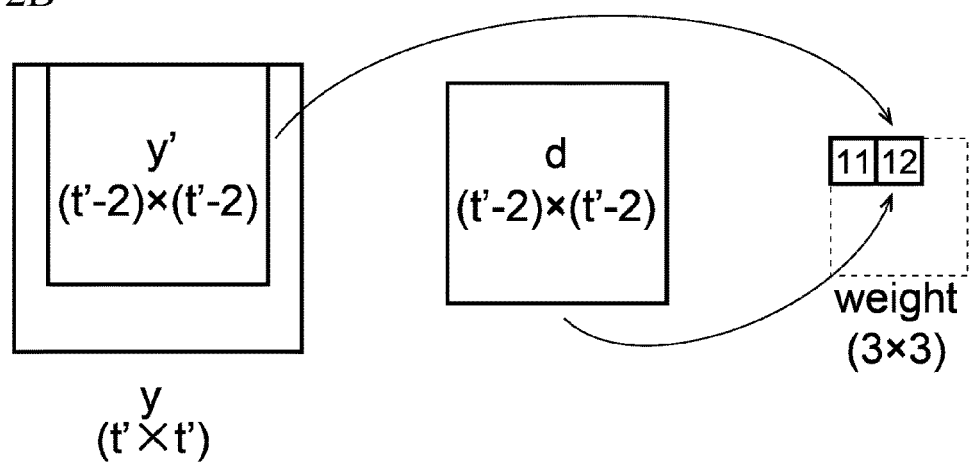

Then, as illustrated in FIG. 32B, the position in which the matrix y' is selected from the sub-top matrix y is shifted by one column from the position of the case of FIG. 32A, and the computation unit 54 performs the same calculation as described above on the selected matrix y' to obtain 12 components of the weight matrix g.

Figure 32C:
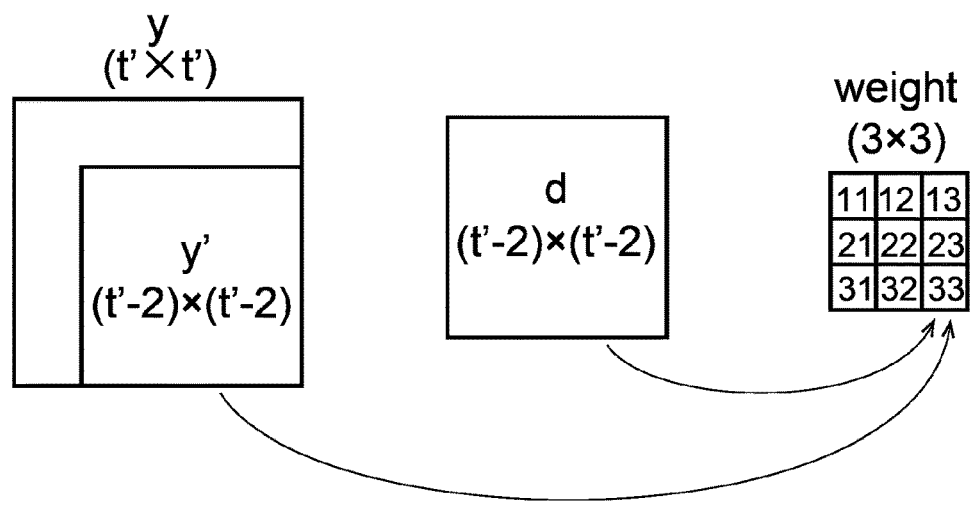

As described above, by repeatedly shifting the position in which the matrix y' is segmented from the sub-top matrix y in a column direction and a row direction, each element of the 3×3 weight matrix g is obtained as illustrated in FIG. 32C.

Through the above processes, the computation of convolution between the top matrix and the bottom matrix in the backward process is completed. In this example, the (t'−2)× (t'−2) sub-bottom matrix d is an example of a first matrix, and the t'×t' sub-top matrix y is an example of a second matrix.

Next, the function of the storing unit 53 when this backward process is performed will be described in detail.

The storing unit 53 sorts the elements of each array as expressed by the following expression (34), and then stores each element to the banks R#0 to R#7 of DPE0 to DPE7.

$$d[N_{major}][Cin_{major}][H][W][Cin_{minor}][N_{minor}]$$

$$g[Cin_{major}][Cout_{major}][H''][W''][Cin_{minor}][Cout_{minor}]$$

$$y[N_{major}][Cout_{major}][H''][W''][N_{minor}][Cout_{minor}] \quad (34)$$

Also in this example, the sub-bottom matrix d is identified by the combination of the batch number N(=($N_{major}$, $N_{minor}$)) and the input channel number Cin(=($Cin_{major}$, $Cin_{minor}$)). The batch number N(=($N_{major}$, $N_{minor}$)) is an example of a first identifier, and the input channel number Cin(=($Cin_{major}$, $Cin_{minor}$)) is an example of a second identifier.

Figure 33:
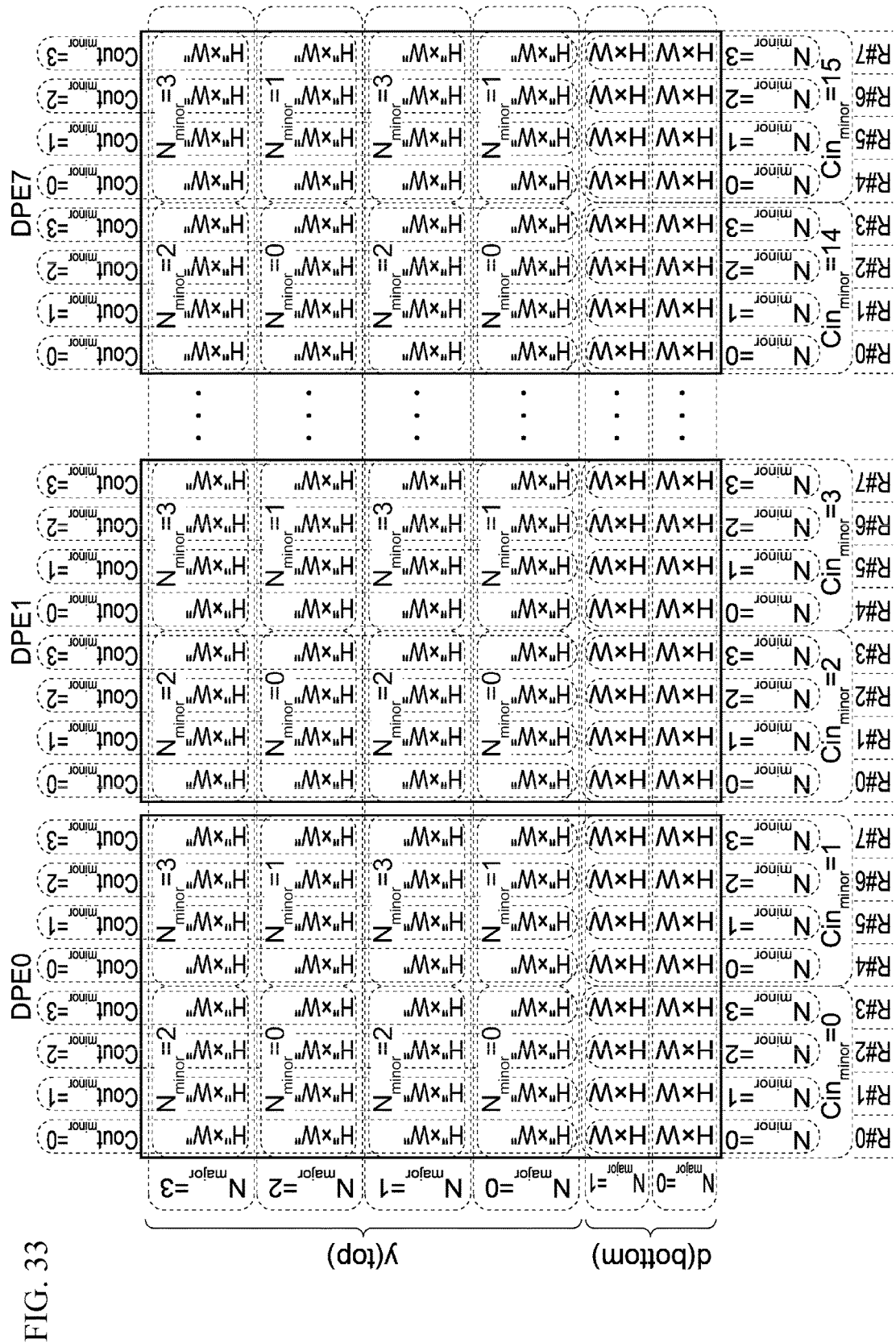
FIG. 33 is a diagram illustrating the contents of the registers G#0 of DPE to DPE7 in which arrays y and d are stored by the storing unit in accordance with the embodiment.

FIG. 33 illustrates the contents of the registers G#0 of DPE0 to DPE7 in which the arrays y and d are stored by the storing unit 53.

The array d is stored in the banks R#0 to R#7 of DPE0 to DPE7 by the sequential method by the storing unit 53.

In this case, in the present embodiment, since $N_{minor}$ is the lowest-level index of the array d and $Cin_{minor}$ is the next higher level index as presented in the expression (34). Thus, each bank corresponds one-to-one with $N_{minor}$ within the range of the same $Cin_{minor}$. Thus, when the total number of $N_{minor}$, is q (=4), the q sub-bottom matrices d having different batch numbers ($N_{major}$, $N_{minor}$) and the same input channel number ($Cin_{major}$, $Cin_{minor}$) are stored in the q banks in one DPE.

For example, four sub-bottom matrices d of which the input channel number Cin is (0, 0) and the batch number N is (0, 0), (0, 1), (0, 2), (0, 3) are respectively stored in four banks R#0 to R#3 in DPE0.

Thus, unlike the example where the batch number N is changed with respect to each of the banks R#0 to R#7 as illustrated in FIG. 13, the convolution of q sub-bottom matrices d with the same input channel number Cin can be computed by q computation cores in parallel.

The sub-top matrix y is transferred from the main memory 11 to DPE0 to DPE7 by the multicast method by the storing unit 53.

Unlike the example of FIG. 30, in this example, $Cout_{minor}$ is the lowest-level index of the array y and $N_{minor}$ is the next higher level index as presented in the expression (34). In addition, it is assumed that the total number of $Cout_{minor}$, is 4 and the total number of $N_{minor}$ is 4.

Accordingly, for example, in DPE0, the elements are stored in the banks R#0 to R#3 in ascending order of the value of $Cout_{minor}$, among the elements of the array y with $N_{major}=0$ and $N_{minor}=0$. Then, the elements of the array with $N_{major}=0$ and $N_{minor}=1$ are stored in the banks R#4 to R#7 in ascending order of the value of $Cout_{minor}$.

The elements with $N_{major}=1$ of the array y are also stored in the banks R#0 to R#3 in ascending order of the value of $Cout_{minor}$, and the elements with $N_{minor}$ greater by one are stored M the banks R#4 to R#7.

Accordingly, the elements of the array y with the same $Cout_{minor}$ value are stored in one bank. Thus, it is not necessary to sort the elements of the array y to make the $Cout_{minor}$ value the same in the bank.

Next, the computation time of the convolution in this backward process will be examined.

The computation time required for obtaining $Gy'G^T$ expressed by the equation (33) in one DPE will be expressed by the following expression (35) by substituting t in the expression (24) with t'.

$$(t' + t') \cdot b(t') \cdot Cout' \cdot N' \cdot \frac{1}{q} \quad (35)$$

Moreover, the computation time for obtaining $B^T dB$ expressed by the equation (33) in one DPE will be expressed by the following expression (36) by respectively substituting 3, t, and cout' in the expression (25) with t'−2, t', and N'.

$$((t'-2) + t') \cdot w(t') \cdot Cin' \cdot N' \cdot \frac{1}{p} \quad (36)$$

Furthermore, in the equation (33), the number of times of multiplication when element-wise multiplication between the matrix $Gy'G^T$ and the matrix $B^T dB$ is performed is expressed by the following equation (37) as with the expression (8).

$$t'^2 \cdot N' \cdot Cin' \cdot Cout' \cdot \frac{1}{p} \quad (37)$$

To compute the convolution between all top matrices and all weight matrices, the computation needs to be performed as many times as the number of times expressed by the following expression (38) as with the expression (27).

$$\frac{HW}{(t-2)^2} \cdot \frac{Cin}{Cin'} \cdot \frac{N}{N'} \cdot \frac{Cout}{cout'} \qquad (38)$$

The first function f(t, q) representing the computation time when the convolution is computed in one DPE can be expressed by the following equation (39) by multiplying the sum of the expressions (35) to (37) by the expression (38).

$$f(t, q) = \frac{HW}{(t'-2)^2} \cdot \frac{Cin}{Cin'} \cdot N \cdot \frac{Cout}{Cout'}$$
$$\left\{ \frac{2t'b(t')Cout'}{q} + 2(t'-1)w(t')\frac{Cin'}{p} + t'^2 Cin' \frac{Cout'}{p} \right\} \qquad (39)$$

Next, the condition that the number of elements of the sub-bottom matrices d and the sub-top matrices y does not exceed the number of elements that the register can store therein will be examined.

First, the number of elements of the sub-top matrix y will be described. The number $E_y$ of elements of the sub-top matrices y in one bank of one DPE can be expressed by the following equation (40).

$$E_y = t'^2 \cdot N' \cdot \frac{Cin'}{p} \qquad (40)$$

In the equation (40), $t^2$ is the number of elements of one sub-top matrix y. In addition, $N' \cdot Cin'/p$ is the number of sub-top matrices y to be stored in one bank.

On the other hand, the number $E_d$ of elements of the sub-bottom matrices d in one bank of one DPE can be expressed by the following equation (41).

$$E_d = (t'-2)^2 \cdot N' \cdot \frac{Cout'}{p} \qquad (41)$$

In the equation (41), $(t'-2)^2$ is the number of elements of one sub-bottom matrix d. In addition, $N' \cdot Cout'/p$ is the number of sub-bottom matrices d to be stored in one bank.

Based on the equation (29) and the equation (30), the second function g(t, q) representing the total number of elements of the sub-top matrices y and the weight matrices g can be expressed by the following equation (42).

$$g(t, q) = E_y + E_d = t'^2 \cdot N' \cdot \frac{Cin'}{p} + (t'-2)^2 \cdot N' \cdot \frac{Cout'}{p} \qquad (42)$$

Thus, when the number of sets of data that can be stored in one bank is R, the constraint condition expressed by the following equation (43) is obtained.

$$g(t, q) = E_y + E_d = t'^2 \cdot N' \cdot \frac{Cin'}{p} + (t'-2)^2 \cdot N' \cdot \frac{Cout'}{p} \leq R \qquad (43)$$

Accordingly, the computational speed of the convolution can be increased by finding the combination of t and q that minimizes the value of the first function f(t, q) of the equation (39) from among the combinations of t and q that satisfy the constraint condition of the equation (43).

Accordingly, when the backward process for obtaining the weight matrix by convolution between the bottom matrix and the top matrix as described in this example is performed, the calculation unit 42 identifies the combinations of t and q that satisfy the constraint condition of the equation (43). Then, the calculation unit 42 calculates the combination of t and q that minimizes the value of the first function f(t, q) of the equation (39) among the identified combinations to increase the computational speed of the convolution.

1×1 Convolution

In deep learning, 1×1 convolution may be performed. For example, ResNet-50 or ResNet 101 uses 1×1 convolution. Thus, 1×1 convolution in the present embodiment will be described.

Although the matrix to be subject to 1×1 convolution is not particularly limited, hereinafter, convolution between the sub-bottom matrix d and the weight matrix g will be described.

When 1×1 convolution between matrices d and g is performed, the storing unit 53 stores the elements of each matrix in the corresponding array expressed by the expression (44), and stores the elements in the banks R#0 to R#7 of DPE0 to DPE7.

$$d[N_{major}][Cin_{major}][H][W][N_{minor}][Cin_{minor}]$$

$$g[1][1][Cin][Cout] \qquad (44)$$

The order of the elements of each array d, g in the expression (44) is the same as that of the expression (5). For example, in the array d, $Cin_{minor}$ is the lowest-level index, and $N_{minor}$ is the next higher level index.

Figure 34:
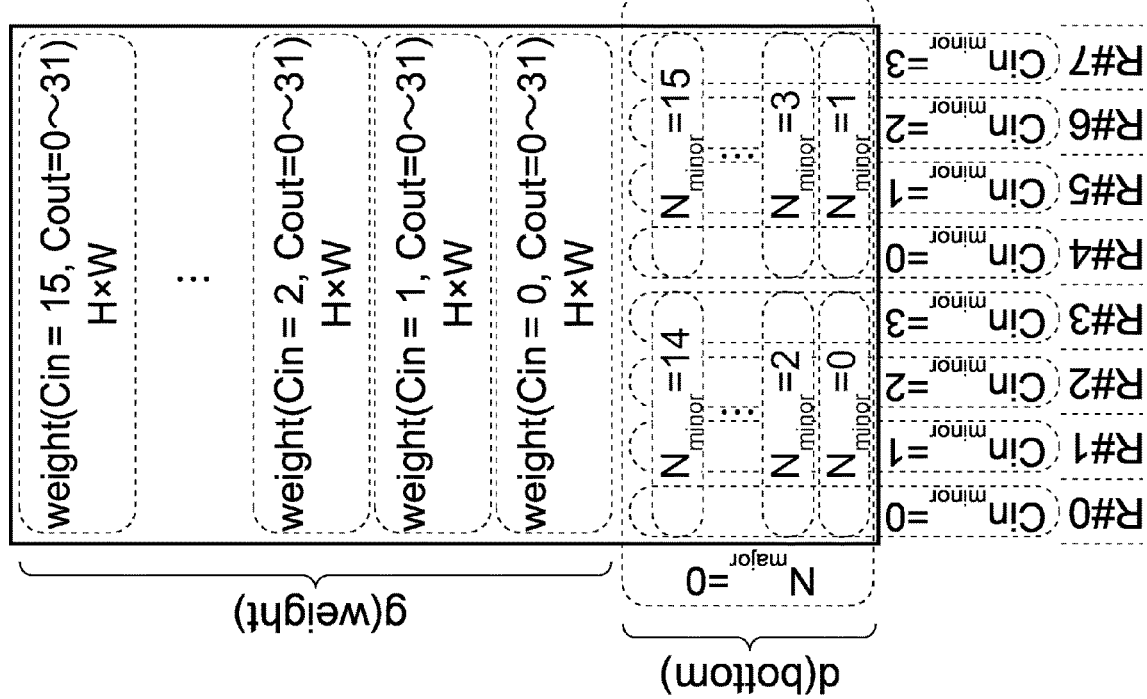
FIG. 34 illustrates the contents of the register G#0 of DPE0 in which arrays d and g are stored by the storing unit when 1×1 convolutions is performed in the embodiment.

FIG. 34 illustrates the contents of the register G#0 of DPE0 in which the arrays d and g are stored by the storing unit 53 when 1×1 convolution is performed.

In the case of the expression (5), the array d is stored in DPE0 to DPE7 by the sequential method as illustrated in FIG. 22, whereas, in this example, the array d is stored in DPE0 to DPE7 by the multicast method.

Thus, for example, the elements with $N_{major}=0$ and $N_{minor}=0$ are stored in the banks R#0, R#1, R#2, and R#3 in the order of $Cin_{minor}=0, 1, 2, 3$. When all the elements with $N_{major}=0$ and $N_{minor}=0$ are stored, then, the elements with $N_{major}=0$ and $N_{minor}=1$ are stored in the banks R#4, R#5, R#6, and R#7 in the order of $Cin_{minor}=0, 1, 2, 3$. Accordingly, the first line of each of the banks R#0 to R#7 is filled, and therefore, the elements with $N_{minor}=2$ or greater are stored in the next line.

The elements of the array d with $N_{major}=1$ is expanded to DPE0 after convolution of the elements with $N_{major}=0$ is finished. The same applies to the elements of the array d with $N_{major}$ of 2 or greater.

In addition, for the array g, the array g is stored in the bank R#0 by the multicast method.

There is no Winograd algorithm applicable to 1×1 convolution. Thus, in this example, the computation unit 54 performs convolution according to the procedure illustrated in FIG. 3A to FIG. 3C by using the elements stored in the banks R#0 to R#7.

Batch Normalization

In deep learning, the performance may be increased by performing batch normalization. The batch normalization is a normalization method that makes the average value of pixel data of each image 0 and makes the distribution of the pixel data 1 when the values of pixel data greatly differs among a plurality of images. This method will be described hereinafter.

When the batch normalization is performed, the storing unit 53 sorts the elements of each array d, y as expressed by the following expression (45), and stores the elements in the banks R#0 to R#7 of DPE0 to DPE7 by the multicast method.

$$d[N_{major}][Cin_{major}][H][W][N_{minor}][Cin_{minor}]$$

$$y[N_{major}][Cin_{major}][H][W][N_{minor}][Cin_{minor}] \quad (45)$$

The batch normalization is applicable to both the bottom matrix and the top matrix. Hereinafter, a case where the batch normalization is performed on the sub-bottom matrix d that is part of the bottom matrix will be described.

Figure 35:
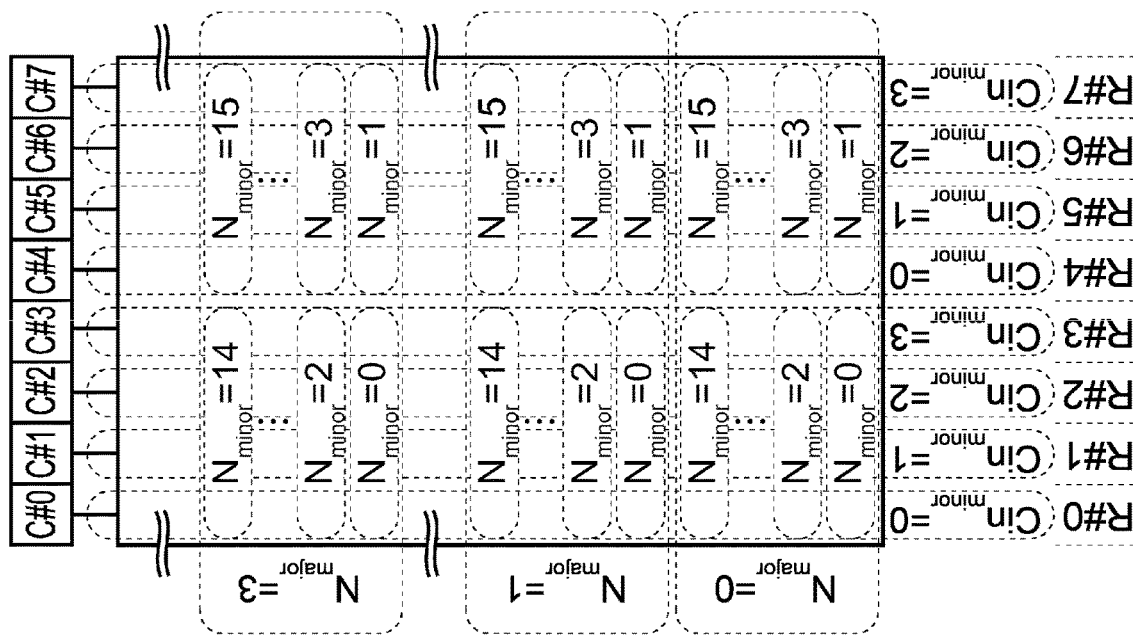
FIG. 35 illustrates the contents of the register G#0 of DPE0 in which a sub-bottom matrix d is stored by the storing unit in accordance with the embodiment during batch normalization.

FIG. 35 illustrates the contents of the register G#0 of DPE0 in which the sub-bottom matrix d is stored by the storing unit 53 when the batch normalization is performed.

In this example, as in FIG. 34, the storing unit 53 stores the sub-bottom matrix d in the bank R#0 by the multicast method. As presented in the expression (45), $Cin_{minor}$ is the lowest-level index of the sub-bottom matrix d. Thus, when focusing on one of the banks R#0 to R#7, the elements having the same $Cin_{minor}$ value are stored in the one bank. For example, only the elements with $Cin_{minor}=0$ are stored in the bank R#0.

In addition, according to the expression (45), in the sub-bottom matrix d, $N_{minor}$ is the higher level index than $Cin_{minor}$. Thus, when focusing on one of the banks R#0 to R#7, the elements with different batch numbers ($N_{major}$, $N_{minor}$) are stored in the one bank. For example, the elements with ($N_{major}$, $N_{minor}$)=(0, 0), (0, 2), ... (0, 14), (1, 0), (1, 2) ... (1, 14) ... (3, 0), (3, 2), ... (3, 14) are stored in the bank R#0.

As described above, the elements with the same $Cin_{minor}$ and different batch numbers ($N_{major}$, $N_{minor}$) are stored in one bank. Thus, each of the computation cores C#0 to C#7 can calculate the average of a plurality of elements with the same $Cin_{minor}$ and different batch numbers ($N_{major}$, $N_{minor}$) and the dispersion of these elements by using only the corresponding one bank.

Figure 36A:
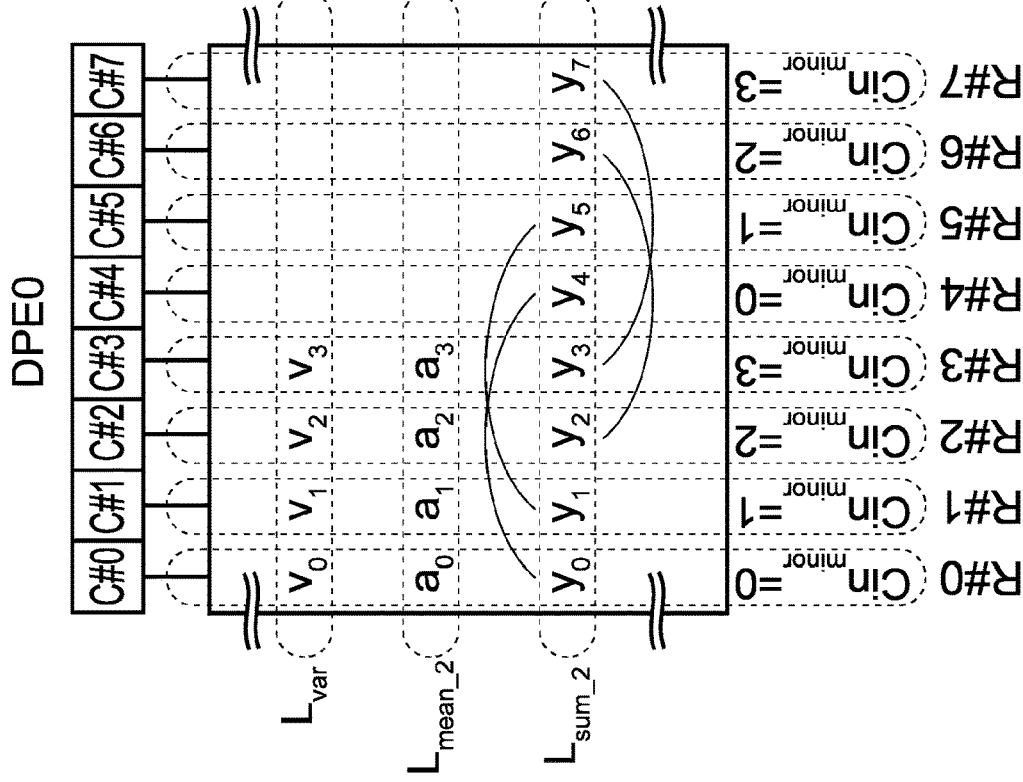
FIG. 36A and FIG. 36B illustrate the contents of the register G#0 of DPE0, and are diagrams for describing the computation performed by the computation unit in accordance with the embodiment during batch normalization.
Figure 36B:
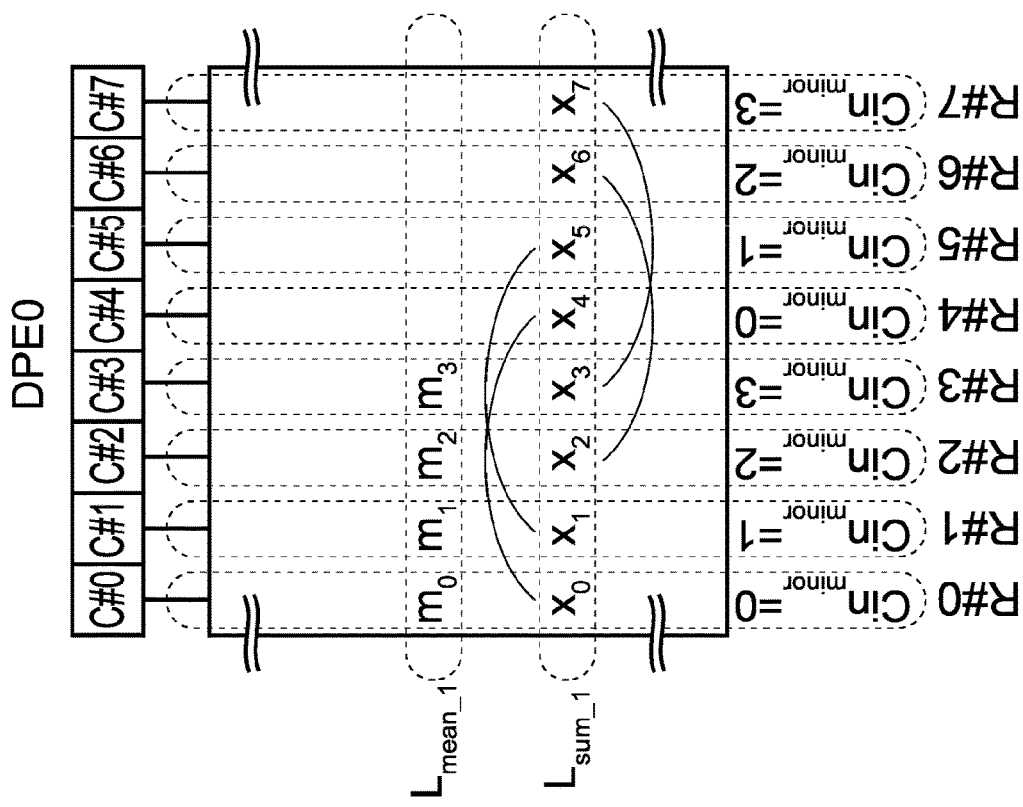

The calculation is performed as follows by the computation unit 54. FIG. 36A and FIG. 36B illustrate the contents of the register G#0 of DPE0, and are diagrams for describing the calculation performed by the computation unit 54 when the batch normalization is performed.

First, as illustrated in FIG. 36A, the computation core C#0 adds up the values of the elements of the sub-bottom matrix d in the bank R#0, and stores the obtained value $x_0$ in the line $L_{sum\_1}$ of the bank R#0. Also in other banks R#1 to R#7, each of the computation cores C#1 to C#7 adds up the values of the elements of the sub-bottom matrix d in the corresponding bank, and then stores the obtained values $x_1$ to $x_7$ to the line $L_{sum\_1}$ of the banks R#1 to R#7, respectively.

Here, as illustrated in FIG. 35, only the elements of which $N_{minor}$ is an even number are stored in the bank R#0. Thus, the value $x_0$ becomes not the sum of the elements of all batch numbers ($N_{major}$, $N_{minor}$) but the sum of the values of the elements of which $N_{minor}$ is an even number.

Thus, the computation unit 54 adds up the values corresponding to the same $Cin_{minor}$ among the values $x_0$ to $x_7$. For example, both the value $x_0$ and the value $x_4$ correspond to $Cin_{minor}=0$. Thus, the computation unit 54 adds up both values and write the result in the value $x_0$. The obtained value $x_0$ is equal to the value obtained by summing the elements with $Cin_{minor}=0$ across the entire batch numbers ($N_{major}$, $N_{minor}$). Similarly, the computation unit 54 performs the following calculations.

$$x_1=x_1+x_5$$

$$x_2=x_2+x_6$$

$$x_3=x_3+x_7$$

Then, the computation core C#0 calculates the average value $m_0$ by dividing the value $x_0$ stored in the bank R#0 by the batch number, and stores the obtained average value $m_0$ in the line $L_{mean}$ of the bank R#0. Also in the banks R#1 to R#3, the computation cores C#1 to C#3 calculate the average values $m_1$ to $m_3$ of the values $x_1$ to $x_3$, respectively, and stores these values in the lines $L_{mean}$ of the banks R#1 to R#3, respectively.

Through the above process, the average values $m_0$ to $m_3$ of the elements of the sub-bottom matrix d are obtained with respect to the banks R#0 to R#3, respectively. Next, the method of calculating the dispersion will be described.

First, as illustrated in FIG. 36B, the computation core C#0 squares the value of each element of the sub-bottom matrix d in the bank R#0, and stores the value $y_0$ obtained by summing the obtained values in the line $L_{sum\_2}$ of the bank R#0. Also in other banks R#1 to R#7, each of the computation cores C#1 to C#7 squares the value of each element in the corresponding bank, sums the obtained values, and stores the obtained value $y_1$ to $y_7$ to the line $L_{sum\_2}$ of the corresponding one of the banks R#1 to R#7.

As in the example of FIG. 36A, the value $y_0$ is not the sum of the squares of the values of the elements across all batch numbers ($N_{major}$, $N_{minor}$) but the value obtained by summing only the values that are squares of the values of the elements of which $N_{minor}$ is an even number. Thus, the computation unit 54 performs the following calculation, and writes the sum of the squares of the elements of the sub-bottom matrix d across all batch numbers ($N_{major}$, $N_{minor}$) in the values $y_0$ to $y_3$.

$$y_0=y_0+y_4$$

$$y_1=y_1+y_5$$

$$y_2=y_2+y_6$$

$$y_3=y_3+y_7$$

Then, the computation core C#0 calculates the average value $a_0$ by dividing the value $y_0$ stored in the bank R#0 by the batch number, and stores the calculated average value $a_0$ in the line $L_{mean\_2}$ of the bank R#0. Also in the banks R#1 to R#3, the computation cores C#1 to C#3 calculate the average values $a_1$ to $a_3$ of the values $y_1$ to $y_3$, and stores these values in the lines $L_{mean\_2}$ of the banks R#1 to R#3, respectively.

Through the above process, the average values $a_0$ to $a_1$ of the squares of the elements of the sub-bottom matrix d are obtained with respect to the banks R#0 to R#3.

Then, the computation unit 54 calculates $v_0=a_0-m_0^2$ to calculate the dispersion $v_0$ of elements of the sub-bottom matrix d of the bank R#0, and then stores the dispersion $v_0$ in the line $L_{var}$ of the bank R#0. In the same manner, the computation unit 54 performs the following calculation to calculate the dispersions $v_1$ to $v_3$ of the elements of the banks R#1 to R#3, and stores the dispersions $v_1$ to $v_3$ in the lines $L_{var}$ of the banks R#1 to R#3, respectively.

$$v_1 = a_1 - m_1^2$$

$$v_2 = a_2 - m_2^2$$

$$v_3 = a_3 - m_3^2$$

Thereafter, the computation unit 54 performs the batch normalization on $Cin_{minor}=i$ (i=0, 1, 2, 3) by dividing the difference between the value ($d[N_{major}][Cin_{major}][H][W][N_{minor}][i]$) of each element of the sub-bottom matrix d and the average value $m_i$ by the dispersion $v_i$ as presented in the following equation (46).

$$d[N_{major}][Cin_{major}][H][W][N_{minor}][i] = \qquad (46)$$
$$\frac{1}{v_i}(d[N_{major}][Cin_{major}][H][W][N_{minor}][i] - m_i)$$

Through the above process, the batch normalization is completed.

By performing the batch normalization as described above, improvement in the teaming performance in deep learning is expected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitution and alterations could be made hereto without departing from the spirit and scope of the invention.

What is claimed is:

1. An information processing device comprising:
a memory; and
a processor coupled to the memory and configured to:
calculate a combination of t and q that minimizes a computation time when q computation cores compute convolution between a plurality of first matrices and a plurality of second matrices of t-row t-column with Winograd algorithm in parallel, where a total number of elements of the plurality of first matrices and the plurality of second matrices does not exceed a number of sets of data that can be stored in each of q storage areas of a register, and the q computation cores respectively correspond to the q storage areas; and
output a program for causing a computing machine to execute a process including: storing the plurality of first matrices and the plurality of second matrices in each of the q storage areas with use of a calculated combination of t and q, and computing convolution between the first matrix and the second matrix with use of the Winograd algorithm by each of the q computation cores, the computing machine including the q computation cores and the register,
when the computation time is represented by a first function f(t, q) and the total number of the elements of the plurality of first matrices and the plurality of second matrices stored in one of the storage areas is represented by a second function g(t, q), the processor is configured to calculate the combination of q and t that minimizes a value of the first function f(t, q) within a range where a value of the second function g(t, q) does not exceed a number of sets of data that can be stored in the one storage area.

2. The information processing device according to claim 1, wherein each of the first matrix and the second matrix is a matrix in a convolution layer of deep learning.

3. The information processing device according to claim 1, wherein
each of the first matrix and the second matrix is a matrix in a convolution layer of deep learning, and
the first function f(t, q) and the second function g(t, q) in a backward process of the deep learning respectively differ from the first function f(t, q) and the second function g(t, q) in a forward process of the deep learning.

4. The information processing device according to claim 1, wherein
each of the plurality of the second matrices is identified by a combination of a first identifier and a second identifier, and
the program causes the computing machine to execute a process of storing each of q second matrices in each of the q storage areas, where the first identifiers of the q second matrices differ from each other, and the second identifiers of the q second matrices are identical.

5. The information processing device according to claim 4, wherein the program causes the computing machine to execute a process including:
storing the first matrix and the second matrix of which the first identifiers are equal to each other in a same storage area, and
computing the convolution between the first matrix and the second matrix stored in the same storage area.

6. The information processing device according to claim 1, wherein the program causes the computing machine to execute a process including:
calculating an average value and a dispersion of values of the elements with respect to each of the plurality of storage areas, and
normalizing the values of the elements by dividing differences between the values of the elements and the average value by the dispersion with respect to each of the plurality of storage areas.

7. A non-transitory computer-readable storage medium storing an information processing program causing a computer to execute a process, the process comprising:
calculating a combination of t and q that minimizes a computation time when q computation cores compute convolution between a plurality of first matrices and a plurality of second matrices of t-row t-column with Winograd algorithm in parallel, where a total number of elements of the plurality of first matrices and the plurality of second matrices does not exceed a number of sets of data that can be stored in each of q storage areas of a register, and the q computation cores respectively correspond to the q storage areas; and
outputting a program for causing a computing machine to execute a process including: storing the plurality of first matrices and the plurality of second matrices in each of the q storage areas with use of a calculated combination of t and q, and computing convolution between the first matrix and the second matrix with use of the Winograd algorithm by each of the q computation cores, the computing machine including the q computation cores and the register,
when the computation time is represented by a first function f(t, q) and the total number of the elements of the plurality of first matrices and the plurality of second matrices stored in one of the storage areas is represented by a second function $g(t, q)$, the calculating includes calculating the combination of q and t that minimizes a value of the first function $f(t, q)$ within a range where a value of the second function $g(t, q)$ does not exceed a number of sets of data that can be stored in the one storage area.

8. An information processing method implemented by a computer, the information processing method comprising:

calculating a combination of t and q that minimizes a computation time when q computation cores compute convolution between a plurality of first matrices and a plurality of second matrices of t-row t-column with Winograd algorithm in parallel, where a total number of elements of the plurality of first matrices and the plurality of second matrices does not exceed a number of sets of data that can be stored in each of q storage areas of a register, and the q computation cores respectively correspond to the q storage areas; and outputting a program for causing a computing machine to execute a process including: storing the plurality of first matrices and the plurality of second matrices in each of the q storage areas with use of a calculated combination of t and q, and computing convolution between the first matrix and the second matrix with use of the Winograd algorithm by each of the q computation cores, the computing machine including the q computation cores and the register, when the computation time is represented by a first function $f(t, q)$ and the total number of the elements of the plurality of first matrices and the plurality of second matrices stored in one of the storage areas is represented by a second function $g(t, q)$, the calculating includes calculating the combination of q and t that minimizes a value of the first function $f(t, q)$ within a range where a value of the second function $g(t, q)$ does not exceed a number of sets of data that can be stored in the one storage area.

* * * * *